US012099577B2

(12) United States Patent
Song et al.

(10) Patent No.: US 12,099,577 B2
(45) Date of Patent: Sep. 24, 2024

(54) OBJECT RECOGNITION METHOD AND APPARATUS, ELECTRONIC DEVICE, AND READABLE STORAGE MEDIUM

(71) Applicant: TENCENT TECHNOLOGY (SHENZHEN) COMPANY LIMITED, Shenzhen (CN)

(72) Inventors: Lingxue Song, Shenzhen (CN); Dihong Gong, Shenzhen (CN); Zhifeng Li, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 392 days.

(21) Appl. No.: 17/520,612

(22) Filed: Nov. 5, 2021

(65) Prior Publication Data
US 2022/0058426 A1 Feb. 24, 2022

Related U.S. Application Data

(63) Continuation of application No. PCT/CN2020/117764, filed on Sep. 25, 2020.

(30) Foreign Application Priority Data

Oct. 23, 2019 (CN) .......................... 201911013447.1

(51) Int. Cl.
*G06F 18/2413* (2023.01)
*G06F 16/53* (2019.01)
(Continued)

(52) U.S. Cl.
CPC .......... *G06F 18/2413* (2023.01); *G06F 16/53* (2019.01); *G06F 16/5854* (2019.01);
(Continued)

(58) Field of Classification Search
None
See application file for complete search history.

(56) References Cited

U.S. PATENT DOCUMENTS 10,275,820 B2 * 4/2019 Guo ....................... G06N 3/045
10,467,142 B1 * 11/2019 Wu ..................... G06F 16/9574
(Continued)

FOREIGN PATENT DOCUMENTS

| CN | 104091163 A | 10/2014 |
| CN | 104751108 A | 7/2015 |

(Continued)

OTHER PUBLICATIONS

Edwards, Jeff, and Hiroshi Murase. "Appearance matching of occluded objects using coarse-to-fine adaptive masks." Proceedings of IEEE Computer Society Conference on Computer Vision and Pattern Recognition. IEEE, 1997. (Year: 1997).*

(Continued)

*Primary Examiner* — Michelle M Entezari Hausmann
(74) *Attorney, Agent, or Firm* — ANOVA LAW GROUP, PLLC

(57) ABSTRACT

An object recognition method is provided. The method includes: detecting an occlusion region of an object in an image, to obtain a binary image; obtaining occlusion binary image blocks; querying a mapping relationship between occlusion binary image blocks and binary masks included in a binary mask dictionary to obtain binary masks corresponding to the occlusion binary image blocks; synthesizing the binary masks queried based on each of the occlusion binary image blocks, to obtain a binary mask corresponding to the binary image; and determining a matching relationship between the image and a prestored object image, based on (Continued)

the binary mask corresponding to the binary image, a feature of the prestored object image, and a feature of the to-be-recognized image.

18 Claims, 9 Drawing Sheets

(51) Int. Cl.

| | |
|---|---|
| *G06F 16/583* | (2019.01) |
| *G06F 18/21* | (2023.01) |
| *G06F 18/214* | (2023.01) |
| *G06F 18/22* | (2023.01) |
| *G06F 18/25* | (2023.01) |
| *G06F 18/28* | (2023.01) |
| *G06N 3/08* | (2023.01) |
| *G06V 10/28* | (2022.01) |
| *G06V 10/50* | (2022.01) |
| *G06V 10/75* | (2022.01) |
| *G06V 40/16* | (2022.01) |

(52) U.S. Cl.
CPC ........ *G06F 18/214* (2023.01); *G06F 18/2163* (2023.01); *G06F 18/22* (2023.01); *G06F 18/25* (2023.01); *G06F 18/28* (2023.01); *G06N 3/08* (2013.01); *G06V 10/28* (2022.01); *G06V 10/50* (2022.01); *G06V 10/757* (2022.01); *G06V 10/759* (2022.01); *G06V 40/172* (2022.01)

(56) References Cited

U.S. PATENT DOCUMENTS

| | | | |
|---|---|---|---|
| 10,635,890 | B2 | 4/2020 | Yan et al. |
| 10,671,855 | B2 * | 6/2020 | Lee .................... G06V 20/49 |
| 11,282,295 | B2 * | 3/2022 | Kang .................. G06V 30/248 |
| 11,315,164 | B2 * | 4/2022 | Bhattacharjee .... G06Q 30/0641 |
| 11,900,256 | B2 * | 2/2024 | Moloney ................ G06N 3/04 |
| 11,948,340 | B2 * | 4/2024 | Yu ........................ G06V 10/25 |
| 2016/0005189 | A1 | 1/2016 | Gray et al. |
| 2016/0127654 | A1 | 5/2016 | Kraft et al. |
| 2019/0205694 | A1 * | 7/2019 | Wang .................. G06V 40/165 |
| 2019/0311202 | A1 | 10/2019 | Lee et al. |
| 2020/0005090 | A1 * | 1/2020 | Shen .................. G06F 18/2321 |
| 2020/0042770 | A1 | 2/2020 | Yan et al. |
| 2021/0042915 | A1 * | 2/2021 | Bernat ................ G06F 18/2413 |
| 2021/0183097 | A1 * | 6/2021 | Georgakis ............ G06V 20/653 |

FOREIGN PATENT DOCUMENTS

| | | |
|---|---|---|
| CN | 107292287 A | 10/2017 |
| CN | 107679502 A | 2/2018 |
| CN | 107909005 A | 4/2018 |
| CN | 108805040 A | 11/2018 |
| CN | 109271878 A | 1/2019 |
| CN | 109784349 A | 5/2019 |
| CN | 109829448 A | 5/2019 |
| CN | 109934177 A | 6/2019 |
| CN | 110084215 A | 8/2019 |
| CN | 110210503 A | 9/2019 |
| CN | 110728330 A | 1/2020 |

OTHER PUBLICATIONS

Hemathilaka, Susith, and Achala Aponso. "A comprehensive study on occlusion invariant face recognition under face mask occlusion." arXiv preprint arXiv:2201.09089 (2022). (Year: 2022).*

Tu Z, Xie W, Zhang D, Poppe R, Veltkamp RC, Li B, Yuan J. A survey of variational and CNN-based optical flow techniques. Signal Processing: Image Communication. Mar. 1, 2019;72:9-24. (Year: 2019).*

Güney, Fatma, and Andreas Geiger. "Deep discrete flow." Computer Vision—ACCV 2016: 13th Asian Conference on Computer Vision, Taipei, Taiwan, Nov. 20-24, 2016, Revised Selected Papers, Part IV 13. Springer International Publishing, 2017. (Year: 2017).*

Song L, Gong D, Li Z, Liu C, Liu W. Occlusion robust face recognition based on mask learning with pairwise differential siamese network. InProceedings of the IEEE/CVF international conference on computer vision 2019 (pp. 773-782). (Year: 2019).*

Kim T, Wee I, Shim DH. Occlusion robust object detection and tracking on a real-time drone. In2019 19th International Conference on Control, Automation and Systems (ICCAS) Oct. 15, 2019 (pp. 1627-1631). IEEE. (Year: 2019).*

O'Mahony N, Campbell S, Carvalho A, Krpalkova L, Hernandez GV, Harapanahalli S, Riordan D, Walsh J. One-shot learning for custom identification tasks; a review. Procedia Manufacturing. Jan. 1, 2019;38:186-93. (Year: 2019).*

Purwanto D, Pramono RR, Chen YT, Fang WH. Three-stream network with bidirectional self-attention for action recognition in extreme low resolution videos. IEEE Signal Processing Letters. Jun. 19, 2019;26(8): 1187-91. (Year: 2019).*

Hsiao E, Hebert M. Coherent occlusion reasoning for instance recognition. In2013 2nd IAPR Asian Conference on Pattern Recognition Nov. 5, 2013 (pp. 1-5). IEEE. (Year: 2013).*

Marszałek, Marcin, and Cordelia Schmid. "Accurate object recognition with shape masks." International journal of computer vision 97.2 (2012): 191-209. (Year: 2012).*

The World Intellectual Property Organization (WIPO) International Search Report for PCT/CN2020/117764 Dec. 21, 2020 7 Pages (including translation).

W. Wan et al., "Occlusion robust face recognition based on mask learning," in 2017 IEEE International Conference on Image Processing (ICIP), pp. 3795-3799, Sep. 2017. 5 pages.

K. Zhang et al., "Joint Face Detection and Alignment Multi-task Cascaded Convolutional Networks," IEEE Signal Processing Letters, 23(10), Oct. 2016. 5 pages.

J. Long et al., "Fully Convolutional Networks for Semantic Segmentation," in the IEEE Conference on Computer Vision and Pattern Recognition (CVPR), Jun. 2015, pp. 3431-3440. 10 pages.

D. Yi et al., "Learning Face Representation from Scratch," arXiv:1411.7923, Nov. 28, 2014. 9 pages.

Q. Cao et al., "VGGFace2: A dataset for recognising faces across pose and age," 2018 13th IEEE International Conference on Automatic Face & Gesture Recognition (FG 2018), May 2018. 11 pages.

The State Intellectual Property Office of the People's Republic of China (SIPO) Office Action 1 for for 201911013447.1 Nov. 30, 2021 16 Pages (including translation).

Lingxue Song et al., "Occlusion Robust Face Recognition Based on Mask Learning with Pairwise Differential Siamese Network," arXiv:1908.06290v1, Aug. 17, 2019. 10 pages.

Mingjie Li et al., "An Anchor Mask Siamese RPN Model for Single Target Tracking," computer engineering, vol. 45 No. 9, Sep. 30, 2019. 6 pages.

Jinhui Hou et al., "Random occlusion assisted deep representation learning for vehicle re-identification," Control Theory and Application, vol. 35 No. 12, Dec. 31, 2018. 6 pages.

Qing Wang et al., "Fast online object tracking and segmentation :a unifying approach," arXiv:1812.05050v2, May 5, 2019. 13 pages.

* cited by examiner

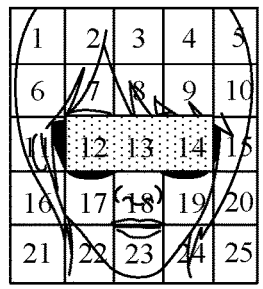

FIG. 7

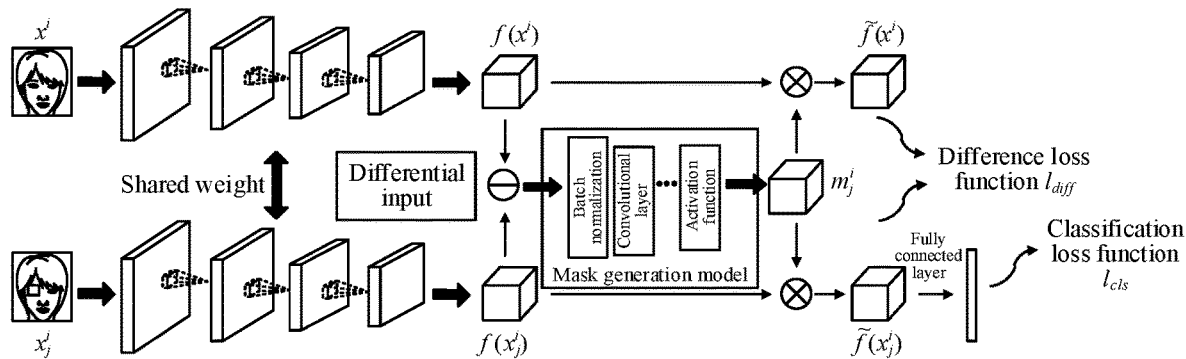

FIG. 8

| Input a plurality of human face image sample pairs into a trained pairwise differential siamese network, to obtain mask sets outputted by a series of mask generators | ~901 |

↓

| Normalize each mask in the mask set | ~902 |

↓

| Calculate an average value of the normalized masks, to obtain an average mask corresponding to a j-th mask generator | ~903 |

↓

| Binarize the average mask, to obtain a binarized dictionary index entry | ~904 |

FIG. 9

OBJECT RECOGNITION METHOD AND APPARATUS, ELECTRONIC DEVICE, AND READABLE STORAGE MEDIUM

RELATED APPLICATION

This application is a continuation application of PCT Patent Application No. PCT/CN2020/117764 filed on Sep. 25, 2020, which claims priority to Chinese Patent Application No. 201911013447.1, filed on Oct. 23, 2019, all of which are incorporated by reference in entirety.

FIELD OF THE TECHNOLOGY

The present disclosure relates to artificial intelligence technologies, and particularly to an object recognition method and apparatus based on artificial intelligence, an electronic device, and a computer readable storage medium.

BACKGROUND

Artificial intelligence (AI) is a theory, method, technology and/or implementation system that uses digital computers or machines controlled by digital computers to simulate, extend and expand human intelligence, so as to perceive environment, acquire knowledge, and use knowledge to obtain best results.

Deep Learning (DL) is a multi-domain interdisciplinary process, involving probability theory, statistics, approximation theory, convex analysis, computational complexity theory, and other disciplines. DL specializes in studying how a computer simulates or implements a human learning behavior to acquire new knowledge or skills, and reorganize an existing knowledge structure, so as to keep improving its performance. The DL generally includes techniques such as artificial neural networks, belief networks, reinforcement learning, transfer learning, and inductive learning, and so on.

As the AI technology has advanced over recent years, the DL plays a dominant role in the field of object recognition of the AI technology. However, a recognition performance of a current DL algorithm can be degraded when an object is partially occluded.

SUMMARY

Embodiments of the present disclosure provide an object recognition method and apparatus, and a computer-readable storage medium, which can maintain a recognition accuracy of recognizing non-occlusion objects, and can also improve a recognition accuracy of recognizing objects that are partially occluded.

In one aspect, the present disclosure provides an object recognition method, the object recognition method performed by an electronic device, and the object recognition method including: detecting an occlusion region of an object in an image, to obtain a binary image that characterizes the occlusion region and a non-occlusion region of the to-be-recognized object; obtaining occlusion binary image blocks that characterize the occlusion region from the binary image; querying a mapping relationship between occlusion binary image blocks and binary masks included in a binary mask dictionary based on the occlusion binary image blocks, to obtain binary masks corresponding to the occlusion binary image blocks; synthesizing the binary masks queried based on each of the occlusion binary image blocks, to obtain a binary mask corresponding to the binary image; and determining a matching relationship between the image and a prestored object image, based on the binary mask corresponding to the binary image, a feature of the prestored object image, and a feature of the image.

In another aspect, the present disclosure provides an object recognition apparatus, including: a memory storing computer program instructions; and a processor coupled to the memory and configured to execute the computer program instructions and perform: detecting an occlusion region of an object in an image, to obtain a binary image that characterizes the occlusion region and a non-occlusion region of the object; obtaining occlusion binary image blocks that characterize the occlusion region from the binary image; querying a mapping relationship between the occlusion binary image blocks and binary masks included in a binary mask dictionary based on the occlusion binary image blocks, to obtain binary masks corresponding to the occlusion binary image blocks; synthesizing the binary masks queried based on each of the occlusion binary image blocks, to obtain a binary mask corresponding to the binary image; and determining a matching relationship between the image and a prestored object image, based on the binary mask corresponding to the binary image, a feature of the prestored object image, and a feature of the image.

In yet another aspect, the present disclosure provides a non-transitory computer-readable storage medium storing computer program instructions executable by at least one processor to perform: detecting an occlusion region of an object in an image, to obtain a binary image that characterizes the occlusion region and a non-occlusion region of the object; obtaining occlusion binary image blocks that characterize the occlusion region from the binary image; querying a mapping relationship between the occlusion binary image blocks and binary masks included in a binary mask dictionary based on the occlusion binary image blocks, to obtain binary masks corresponding to the occlusion binary image blocks; synthesizing the binary masks queried based on each of the occlusion binary image blocks, to obtain a binary mask corresponding to the binary image; and determining a matching relationship between the image and a prestored object image, based on the binary mask corresponding to the binary image, a feature of the prestored object image, and a feature of the image.

Other aspects of the present disclosure can be understood by those skilled in the art in light of the description, the claims, and the drawings of the present disclosure.

The embodiments of the present disclosure have the following beneficial effects:

The object recognition method based on artificial intelligence provided by the embodiment of the present disclosure distinguishes an occlusion region and a non-occlusion region in a to-be-recognized image, and obtains a binary mask of the occlusion region in the to-be-recognized image, so as to perform image recognition based on the binary mask, the to-be-recognized image and a prestored image. In this way, when or in response to determining that a to-be-recognized object is occluded, influences caused by the occlusion region on feature elements of the to-be-recognized object are suppressed, thereby improving an accuracy of recognizing the to-be-recognized object.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

FIG. 7 is a schematic diagram of a segmentation of a human face image according to an object recognition method according to one or more embodiments of the present disclosure;

FIG. 8 is a schematic structural diagram of a pairwise differential siamese network (PDSN) according to an object recognition method according to one or more embodiments of the present disclosure;

FIG. 9 is a schematic flowchart of computing each index entry $M_j$ in a binary mask dictionary according to an object recognition method according to one or more embodiments of the present disclosure;

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

In certain embodiments, the term "first/second" is merely intended to distinguish similar objects but does not necessarily indicate a specific order of an object. The term "first/second" is interchangeable in terms of a specific order or sequence if permitted, so that the embodiments of the present disclosure described herein can be implemented in a sequence in addition to the sequence shown or described herein.

Unless otherwise defined, meanings of all technical and scientific terms used in the present disclosure are the same as those usually understood by a person skilled in the art to which the present disclosure belongs.

Terms used in this specification are merely intended to describe objectives of the embodiments of the present disclosure, but are not intended to limit the present disclosure.

Before the embodiments of the present disclosure are further described in detail, nouns and terms involved in the embodiments of the present disclosure are described. The nouns and terms provided in the embodiments of the present disclosure are applicable to the following explanations.

1) Convolution feature $f(\bullet)$: referring to an output of a convolutional layer of a convolutional neural network (CNN), which is generally a three-dimensional tensor with C channels, a height of H, and a width of W, namely $f(\bullet) \in R^{C*H*W}$.

2) Convolution feature element: a tensor element with coordinates (c, h, w).

3) Feature elements at the same spatial position of a convolution feature: elements of C channels with the same h-dimensional and w-dimensional coordinates.

4) Mask: a three-dimensional tensor having the same size as a top-layer convolution feature.

Figure 1:
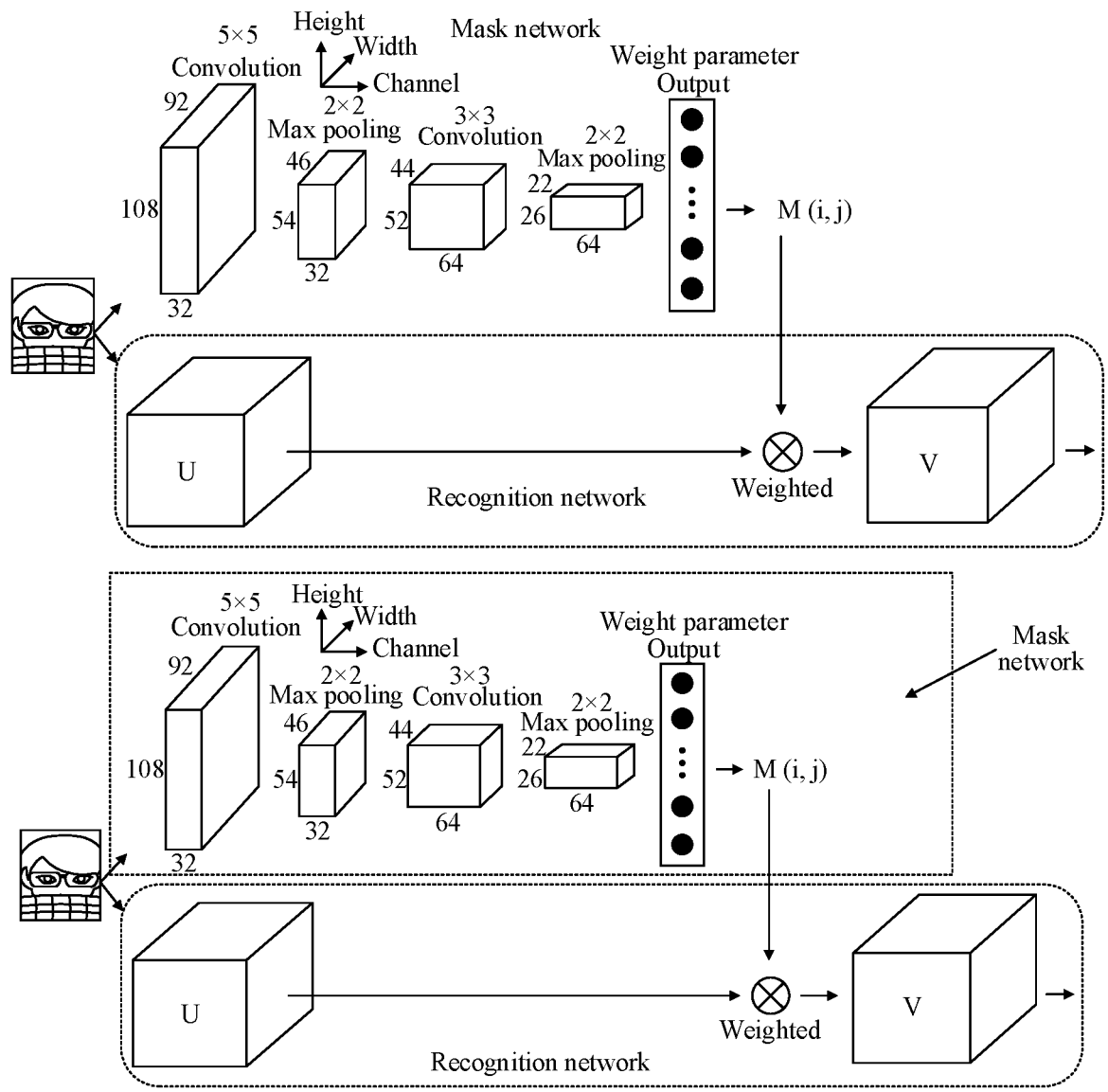
FIG. 1 is a schematic diagram of occlusion recognition by a comparative mask network according to one or more embodiments of the present disclosure.

The DL has been widely employed in the field of object recognition. However, the DL algorithm has been met with limited performance due to partial occlusion. Referring to FIG. 1, it is a schematic diagram of occlusion recognition by a mask network in the related art. In the related art, a mask network module is embedded in a middle layer of a basic CNN, to form a recognition network. This module uses two-layer convolution to directly learn a set of weights M(i, j) from an inputted object image. A convolutional layer is used to perform feature extraction processing on the inputted image, and a pooling layer is used to perform maximum pooling processing. Then, a convolutional layer is used to perform feature extraction processing on the inputted image, and a pooling layer is used to perform maximum pooling processing, to obtain the set of weights M(i, j). Each weight is multiplied with a feature of a corresponding spatial position of the convolution feature in the basic CNN. Through end-to-end training and learning, the module outputs larger weighs to useful features, and outputs smaller weights to features undermined by an occlusion, thereby achieving the purpose of reducing influences caused by the occlusion.

However, the mask network module branch of this solution outputs the same weight value for the feature elements of all channels at the same spatial position of the convolution feature. That is, the feature element of each channel of the convolution feature is considered to be similarly influenced by an occlusion. As shown in FIG. 1, an original feature U is transformed to a weighted feature V. The feature elements have not been subjected to different weighting processing in terms of the channel dimension. It is found that through analysis and experimental verification, even for the same spatial position of the convolution feature, a feature element value of each channel at this position changes differently under occlusion conditions. Therefore, the related technical solution has loopholes in principle. Besides, in an implementation scenario of the object recognition system, a similarity between a feature of a to-be-recognized object and a feature of each object in a database is generally calculated, and then the recognition is performed. The idea of the solution shown in FIG. 1 is merely to reduce influences of the occlusion part in the feature of the to-be-recognized occlusion object, but fails to solve the problem that there exists an information inconsistency when calculating the similarity between the feature of the to-be-recognized object and the feature of each object in the database. For example, in a situation of a to-be-recognized object with sunglasses, this solution merely enables the sunglasses part as little as possible to influence the feature of the test object, while the non-occlusion objects in the database still retain the feature of the original part that is occluded by the sunglasses under the network structure of this solution. Therefore, when calculating the similarity, the region of the original part still generates a strong influence of inconsistency, and the influence that the original part is occluded still exists.

Therefore, the problem to be solved in the present disclosure is to provide an object recognition system that is robust to occlusions based on a deep convolutional network having a good performance in general recognition scenarios (no occlusion or less occlusion). The object recognition system, which starts from visual experience of human eyes, explicitly finds out convolution feature elements that are undermined under any occlusion conditions. Besides, interference information carried by these feature elements is removed in a similarity calculation step when recognizing a to-be-recognized object, to ensure that the recognition is based on a non-occlusion part of the to-be-recognized object, which is in line with the visual experience of human eyes.

An embodiment of the present disclosure provides a PDSN structure, to explicitly learn a mapping relationship between occlusion regions and feature elements undermined by occlusions. A binary mask dictionary is established based on the mapping relationship. Each index entry in the dictionary represents feature elements that are greatly influenced when or in response to determining that a certain region is occluded. According to this dictionary, feature elements that are intended to be removed under different occlusion conditions can be obtained. During recognition, response values of these elements can be suppressed, thereby achieving robustness to occlusion.

The embodiments of the present disclosure provide an object recognition method and apparatus based on artificial intelligence, an electronic device, and a computer-readable storage medium, which can suppress influences caused by an occlusion region on feature elements of a to-be-recognized object when or in response to determining that the to-be-recognized object is occluded, thereby improving an accuracy of recognizing the to-be-recognized object. The following describes an exemplary implementation of an object recognition device based on artificial intelligence provided by an embodiment of the present disclosure. An electronic device provided by an embodiment of the present disclosure may be implemented as any of user terminals of different types, such as a notebook computer, a tablet computer, a desktop computer, a set-top box, and a mobile device (for example, a mobile phone, a portable music player, a personal digital assistant, a dedicated messaging device, and a portable game device), or may be implemented as a server. The following description is an exemplary implementation when or in response to determining that the device is implemented as a server.

In some embodiments, a server 200 may be an independent physical server, or a server cluster constituted by a plurality of physical servers, or a distributed system, or a cloud server providing basic cloud computing services such as cloud services, cloud databases, cloud computing, cloud functions, cloud storage, network services, cloud communications, middleware services, domain name services, security services, content delivery networks (CDN), big data and artificial intelligence platforms. A terminal 400 may be a smart phone, a tablet computer, a notebook computer, a desktop computer, a smart speaker, a smart watch and so on, but is not limited to these. The terminal and the server may be directly or indirectly connected through wired or wireless communication, which is not limited in the embodiments of the present disclosure.

Figure 2:
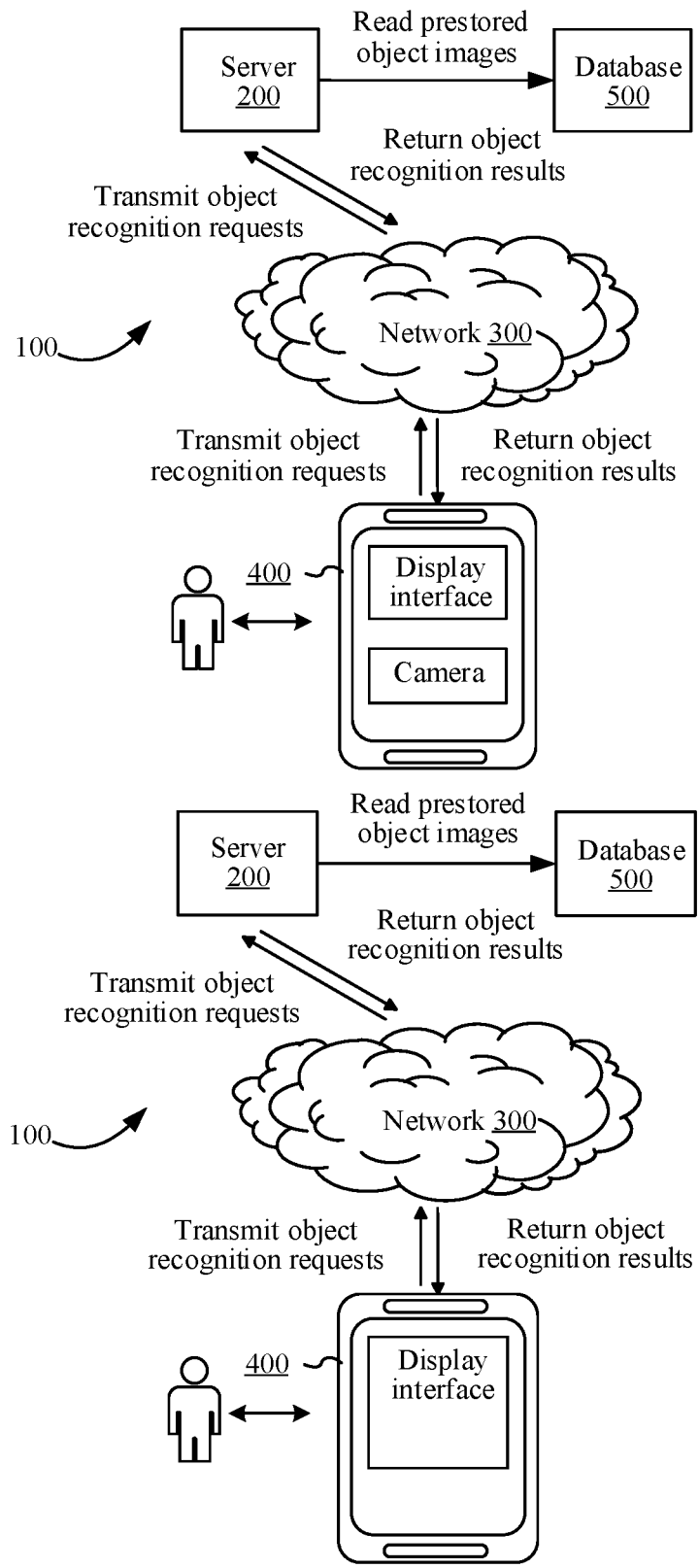
FIG. 2 is a schematic diagram of an implementation scenario of an object recognition system based on artificial intelligence according to one or more embodiments of the present disclosure.

Referring to FIG. 2, it is a schematic diagram of an implementation scenario of an object recognition system based on artificial intelligence provided by an embodiment of the present disclosure. An object recognition system 100 also includes the terminal 400, a network 300, the server 200, and a database 500. The terminal 400 is connected to the server 200 through the network 300. The network 300 may be a wide area network or a local area network, or a combination of the two. A to-be-recognized image is obtained by a camera of the terminal 400. In response to receiving an object recognition request of the terminal 400, the server 200 reads a prestored object image in the database 500, and determines a matching relationship between the to-be-recognized image and the prestored object image. The server returns the determined matching relationship as an object recognition result to a display interface of the terminal 400 for displaying.

In certain embodiment, the term "to-be-recognized image" may be referred to as an image or the image.

Figure 3:
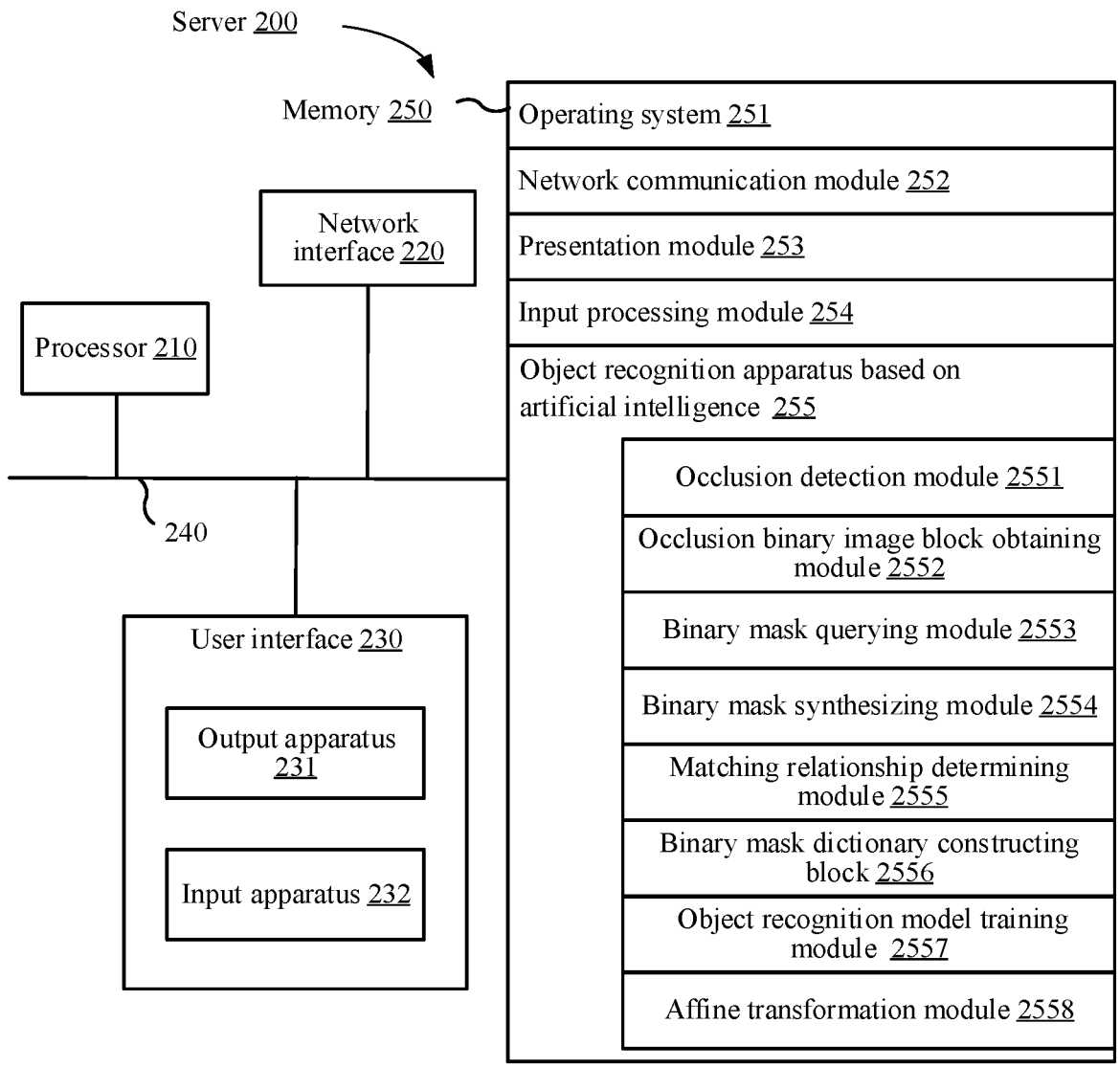
FIG. 3 is a schematic structural diagram of an electronic device according to one or more embodiments of the present disclosure.

Referring to FIG. 3, it is a schematic structural diagram of an electronic device provided by an embodiment of the present disclosure. The server 200 shown in FIG. 3 includes: at least one processor 210, a memory 250, at least one network interface 220, and a user interface 230. Each component in the server 200 is coupled together through a bus system 240. The bus system 240 is configured to implement connection and communication between the components. In addition to a data bus, the bus system 240 also includes a power bus, a control bus, and a status signal bus. However, different buses are all marked as the bus system 240 in FIG. 3 for clarity.

The processor 210 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any suitable processor, or the like.

The user interface 230 includes one or more output apparatus 231 that can present media content, including one or more speakers and/or one or more visual display screens. The user interface 230 also includes one or more input apparatus 232, including user interface elements that facilitate user input, such as a keyboard, a mouse, a microphone, a touch display screen, a camera, and other input button and control.

The memory 250 may be removable, non-removable, or a combination thereof. An exemplary hardware structure includes a solid-state memory, a hard disk drive, an optical disk drive, and so on. The memory 250 includes one or more storage elements that are physically remote from the processor 210.

The memory 250 includes a volatile memory or a nonvolatile memory, and may alternatively include both the volatile and the nonvolatile memory. The non-volatile memory may be a read only memory (ROM). The volatile memory may be a random access memory (RAM). The memory 250 described in this embodiment of the present disclosure is to include any other suitable type of memories.

In some embodiments, the memory 250 may store data to support various operations. Examples of these data include programs, modules, and data structures, or a subset or superset thereof. An exemplary description is given below.

An operating system 251 includes a system program that is configured for processing various basic system services and performing hardware-related tasks, such as a framework layer, a core library layer, a driver layer, and so on, for implementing different services and processing hardware-based tasks.

A network communication module 252 is configured to reach other computing devices via one or more (wired or wireless) network interfaces 220. An exemplary network interface 220 includes: a Bluetooth, a wireless fidelity (WiFi), a universal serial bus (USB), and so on.

A presentation module 253 is configured to enable information presentation (such as for operating peripheral devices and user interfaces that display content and information) via one or more output apparatus 231 (for example, a display screen, a speaker, and so on) associated with the user interface 230.

An input processing module 254 is configured to detect one or more user inputs or interactions from one of the one or more input apparatus 232, and translate the detected inputs or interactions.

In some embodiments, the apparatus provided in the embodiments of the present disclosure may be implemented in software. FIG. 3 shows an object recognition apparatus 255 based on artificial intelligence stored in the memory 250, which may be software in forms of programs and plug-ins, including the following software modules: an occlusion detecting module 2551, an occlusion binary image block obtaining module 2552, a binary mask querying module 2553, a binary mask synthesizing module 2554, a matching relationship determining module 2555, a binary mask dictionary constructing module 2556, an object recognition model training module 2557, and an affine transformation module 2558. These modules are logical and accordingly may be arbitrarily combined or further split according to functions. The function of each module will be described below.

In some other embodiments, the object recognition apparatus based on artificial intelligence provided in the embodiments of the present disclosure may be implemented in hardware. As an example, the object recognition apparatus based on artificial intelligence provided by the embodiments of the present disclosure may be a processor in a form of a hardware decoding processor, which is programmed to execute the object recognition method based on artificial intelligence provided by the embodiments of the present disclosure. For example, the processor in a form of a hardware decoding processor may use one or more application specific integrated circuits (ASIC), digital signal processors (DSP), programmable logic devices (PLD), complex programmable logic devices (CPLD), field-programmable gate arrays (FPGA) or other electronic components.

An object recognition method based on artificial intelligence provided by an embodiment of the present disclosure will be described in conjunction with an exemplary implementation and implementation of a server provided by an embodiment of the present disclosure.

The object recognition method based on artificial intelligence provided by an embodiment of the present disclosure is descried below for two stages, the first part of which is a training stage of a model, and the second part of which is a recognition stage of using the model.

Figure 4:
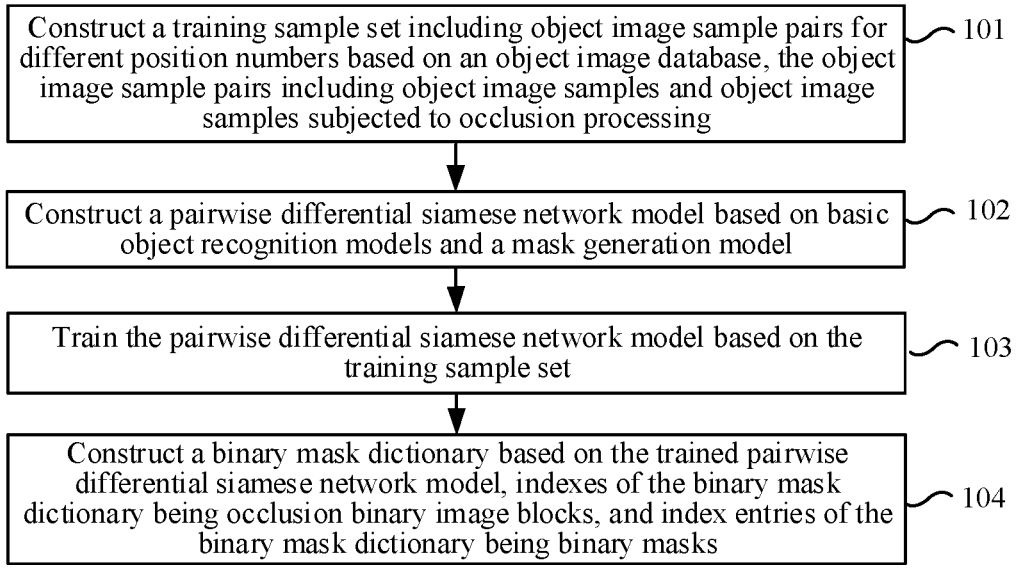
FIG. 4 is a schematic flowchart of an object recognition method according to one or more embodiments of the present disclosure.

The following describes the training stage of a model. Referring to FIG. 4, it is a schematic flowchart of an object recognition method based on artificial intelligence provided by an embodiment of the present disclosure. Reference is made in the following detailed description to steps 101 to 104 shown in FIG. 4. The steps of the method described below may be implemented on an electronic device of any type (for example, a terminal or a server).

Step 101. Construct a training sample set including object image sample pairs for different position numbers based on an object image database. The object image sample pairs include object image samples and object image samples subjected to occlusion processing.

An object herein may be a person, an animal, or an item. Occlusion recognition for a person may be performed based on an object recognition model used for human face recognition. Occlusion recognition for an animal may be performed based on an object recognition model used for animal face recognition, which can recognize a certain animal species or different animal categories. Occlusion recognition for an item may be performed based on an object recognition model that is used to recognize a certain type of item.

In some embodiments, the training sample set may also be constructed before a binary mask dictionary is constructed. The training sample set is constructed based on the object image database. The operation of constructing a training sample set including object image sample pairs for different position numbers based on an object image database in step 101 may be implemented by the following technical solution: obtaining an object image sample in the object image database, and performing uniform segmentation on the object image sample, to obtain position numbers corresponding to different object image sample blocks; performing occlusion processing on an object image sample block corresponding to a position number in the object image sample; constructing the object image sample and an object image sample subjected to the occlusion processing into an object image sample pair for the position number; and forming the training sample set based on the object image sample pairs of different position numbers.

In some embodiments, an object image sample is uniformly segmented, for example, into 12 object image sample blocks after the uniform segmentation. Position numbers are assigned to the 12 object image sample blocks correspondingly. Each object image sample block corresponds to one position number. The occlusion processing is performed on an object image sample block corresponding to a position number in the object image sample. For example, the occlusion processing is performed on an object image sample block corresponding to a position number of 11, to obtain an object image sample pair. An object image sample pair includes an original object image sample that is not subjected to the occlusion processing and an object image sample in which a corresponding object image sample block subjected to the occlusion processing. A plurality of object image sample pairs may be constructed for the same position number. Although objects in different object image sample pairs are different, the occlusion processing is performed at the same position.

Step 102. Construct a PDSN model based on basic object recognition models and a mask generation model.

In some embodiments, a PDSN model is constructed based on basic object recognition models and a mask generation model. Then, the PDSN model is trained based on the training sample set. The binary mask dictionary is constructed based on the trained PDSN model. Indexes of the binary mask dictionary are occlusion binary image blocks, and index entries of the binary mask dictionary are binary masks. Herein, the PDSN model includes two identical basic object recognition models whose structures are based on CNNs. An absolute value of a difference between features extracted by the two basic object recognition models is used as an attention mechanism, so that an essence of the mask generation model processing the absolute value is to focus on feature elements that are influenced by an occlusion. The mask generation model is constituted by common neural network units, including a batch normalization (BN) layer, a convolutional layer, and so on. A process of training the PDSN is actually equivalent to training the mask generation model. The basic object recognition models are general models that have been trained to perform object recognition. In the process of training the PDSN, parameters of the basic object recognition models are fixed, and only parameters of the mask generation model are trained and updated.

Step 103. Train the PDSN model based on the training sample set.

In some embodiments, the operation of training the PDSN model based on the training sample set in step 103 is implemented by the following technical solution: initializing the mask generation model in the PDSN model, and initializing a loss function including an input sample, an input sample feature, a classification probability, and a parameter of the mask generation model. The following operations are performed during each iteration of training the PDSN model: using the object image sample pairs included in the training sample set as the input sample, and performing, by the PDSN model, feature extraction on the input sample, to obtain the input sample feature; performing, by an object recognition model, classification and recognition on the object image samples subjected to the occlusion processing, to obtain the classification probability; substituting the input sample, the input sample feature, and the classification probability into the loss function, to determine the parameter of the mask generation model when or in response to determining that the loss function takes a minimum value; and updating the PDSN model according to the determined parameter of the mask generation model.

In some embodiments, the training sample set includes object image sample pairs for different position numbers. When or in response to determining that the PDSN model is trained using object image sample pairs for a certain position number, the mask generation model after the training is a mask generation model for the certain position number. In this way, the mask generation model is used to find out feature elements that are influenced by an occlusion and intended to be suppressed in a convolution feature of an object image 1, when or in response to determining that an image block of each position number is occluded.

In some embodiments, the mask generation model is initialized; besides, the input sample, an output result, and the parameter of the mask generation model in the loss function are also initialized. Herein, the output result includes the input sample feature and the classification probability. The input sample is the object image sample pairs included in the training sample set. In a process of training the mask generation model for a position number, the sample pairs for the corresponding position number are used for the training. The PDSN model performs feature extraction on the input sample, to obtain the input sample feature. The input sample feature herein is obtained after being processed by the mask generation model.

In some embodiments, the operation of using the object image sample pairs included in the training sample set as the input sample, and performing, by the PDSN model, feature extraction on the input sample, to obtain the input sample feature may be implemented by the following technical solution: using the object image sample pairs for the same position number in the training sample set as the input sample, and performing, by a convolutional layer in the PDSN model, the feature extraction on the input sample, to obtain a first feature and a second feature respectively corresponding to the object image samples and the object image samples subjected to the occlusion processing; performing, by the mask generation model in the PDSN model, mask generation processing on an absolute value of a difference between the first feature and the second feature, to obtain a mask for the position number; and multiplying the first feature and the second feature with the mask respectively, to obtain the input sample feature.

The mask generation model herein is constituted by common neural network units, including a normalization layer, a convolutional layer, and so on. A feature obtained by the convolutional layer is mapped to a range of [0,1], and a mask having the same size as the convolution feature is obtained by the mask generation model. That is, the mask for a certain position number is a three-dimensional tensor having the same size as the first feature and the second feature. Each element in the mask is multiplied with a corresponding element in the first feature and the second feature, to obtain new convolution features as the input sample feature.

In some embodiments, the object recognition model performs the classification and recognition on the object image samples subjected to the occlusion processing, to obtain the classification probability. The classification probability herein may be a probability of correct classification. The mask generation model is corrected and updated according to the probability of correct classification and the input sample feature. That is, the input sample, the input sample feature, and the classification probability are substituted into the loss function, to determine the parameter of the corresponding mask generation model when or in response to determining that the loss function takes a minimum value. The PDSN model is updated according to the determined parameter of the mask generation model.

Step 104. Construct a binary mask dictionary based on the trained PDSN model. Indexes of the binary mask dictionary are occlusion binary image blocks, and index entries of the binary mask dictionary are binary masks.

In some embodiments, the operation of constructing a binary mask dictionary based on the trained PDSN model in step 104 may be implemented by the following technical solution: performing, by the PDSN model, mask extraction on the object image samples for the same position number, to obtain a mask set corresponding to the position number; normalizing each mask in the mask set, and calculating an average based on a normalization result of each mask, to determine an average mask of the corresponding position number; using the occlusion binary image block corresponding to the position number as an index of the binary mask dictionary, and binarizing the average mask, to use a generated binary mask as an index entry of the binary mask dictionary.

In some embodiments, the trained PDSN is used to extract a mask set of object image sample pairs for a position number in the training sample set. When or in response to determining that there are N object image sample pairs in the training sample set, the mask set includes N masks. Each of the N masks is normalized, and an average value is calculated based on a normalized result of each mask, to determine an average mask of the corresponding position number. The occlusion binary image block corresponding to the position number is used as the index of the binary mask dictionary. The average mask is binarized, and the generated binary mask is used as the index entry of the binary mask dictionary.

For example, in an average mask, a smaller mask value indicates that a corresponding convolution feature element is more suppressed. For any position number, convolution feature elements corresponding to τ*K smallest mask values in the average mask are regarded as parts that are undermined by an occlusion. τ is a real number in a range of [0,1], which may be 0.25; K is a total number of elements in the average mask for any position number, and is also a total number of elements in the top-layer convolution feature K=C*H*W, C being a quantity of channels, H being a height, and W being a width. It is found that through analysis and experimental verification, even for the same spatial position of the convolution feature, there also exists a relatively large difference in the change of a feature element value of each channel at this position under occlusion conditions. Therefore, a process of obtaining the index entry $M_j$ of the binary mask dictionary from the average mask $\overline{m}_j$ is actually based on the K elements of the top-layer convolution feature (an element in each channel at each spatial position). The binarization is performed as follows:

$$M_j[k]=0, if \overline{m}_j[k] \in \{\tilde{m}_j[1], \tilde{m}_j[2], \ldots, \tilde{m}_j[\tau*K]\}$$

$$M_j[k]=1, else \qquad (1);$$

where, k represents a k-th mask value, and $\{\tilde{m}_j[1], \tilde{m}_j[2], \ldots, \tilde{m}_j[\tau*K]\}$ represents τ*K smallest mask values in an average mask.

In some embodiments, the following technical solution may also be performed before performing the object recognition: training the basic object recognition models used for obtaining a feature of a prestored object image and a feature of the to-be-recognized image based on the training sample set formed by the object image database; and training the object recognition model used for determining a matching relationship between the to-be-recognized image and the prestored object image based on the training sample set. The object recognition model includes basic object recognition models and a binary mask processing module.

In some embodiments, the operation of training the object recognition model used for determining a matching relationship between the to-be-recognized image and the prestored object image based on the training sample set in the above technical solution may be implemented by the following technical solution: initializing a fully connected layer of the object recognition model, and initializing a loss function including an input sample, a classification and recognition result, and a parameter of the fully connected layer in the object recognition model. The following operations are performed during each iteration of training the object recognition model: using the object image samples subjected to the occlusion processing included in the training sample set and the corresponding binary masks in the binary mask dictionary as the input sample, and performing, by the object recognition model, classification and recognition on the input sample, to obtain a classification and recognition result corresponding to the input sample; substituting the input sample, and the classification and recognition result into the loss function, to determine the parameter of the fully connected layer in the object recognition model when or in response to determining that the loss function takes a minimum value; and updating the object recognition model according to the determined parameter of the fully connected layer.

The following description is the recognition stage of an object recognition method based on artificial intelligence according to an embodiment of the present disclosure.

Figure 5A:
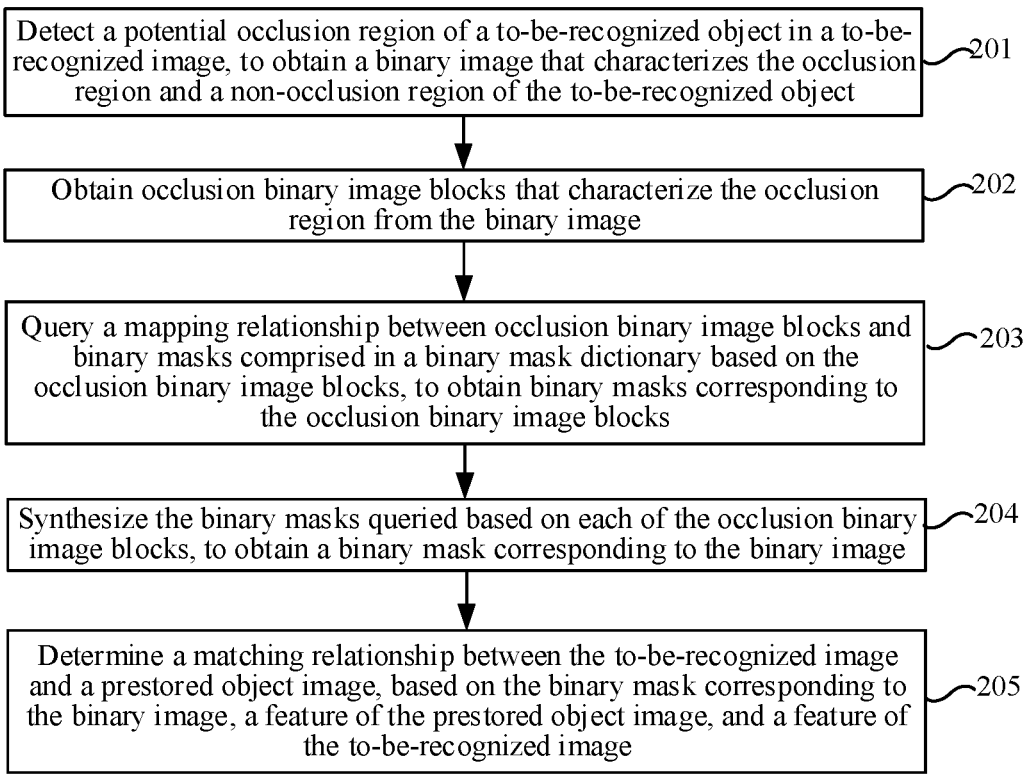
FIG. 5A to FIG. 5D are schematic flowcharts of object recognition methods according to one or more embodiments of the present disclosure.

Referring to FIG. 5A, it is a schematic flowchart of an object recognition method based on artificial intelligence provided by embodiments of the present disclosure. Reference is made in the following description to steps 201 to 205 shown in FIG. 5A. The steps of the method described below may be implemented on any type of electronic device (for example, a terminal or a server).

Step 201. Detect a potential occlusion region of a to-be-recognized object in a to-be-recognized image, to obtain a binary image that characterizes the occlusion region and a non-occlusion region of the to-be-recognized object.

In certain embodiments, the term "to-be-recognized object" may be referred to as an object or the object.

Herein, the potential occlusion region of the to-be-recognized object characterizes that the to-be-recognized object may be occluded or may not be occluded. In an obtained binary image, 0 represents a non-occlusion pixel, and 1 represents an occlusion pixel. A CNN structure performs occlusion detection on the to-be-recognized object in the to-be-recognized image. The fully convolutional network structure herein is obtained through training based on artificially synthesized occlusion data and self-labeled real occlusion data.

Step 202. Obtain occlusion binary image blocks that characterize the occlusion region from the binary image.

Figure 5B:
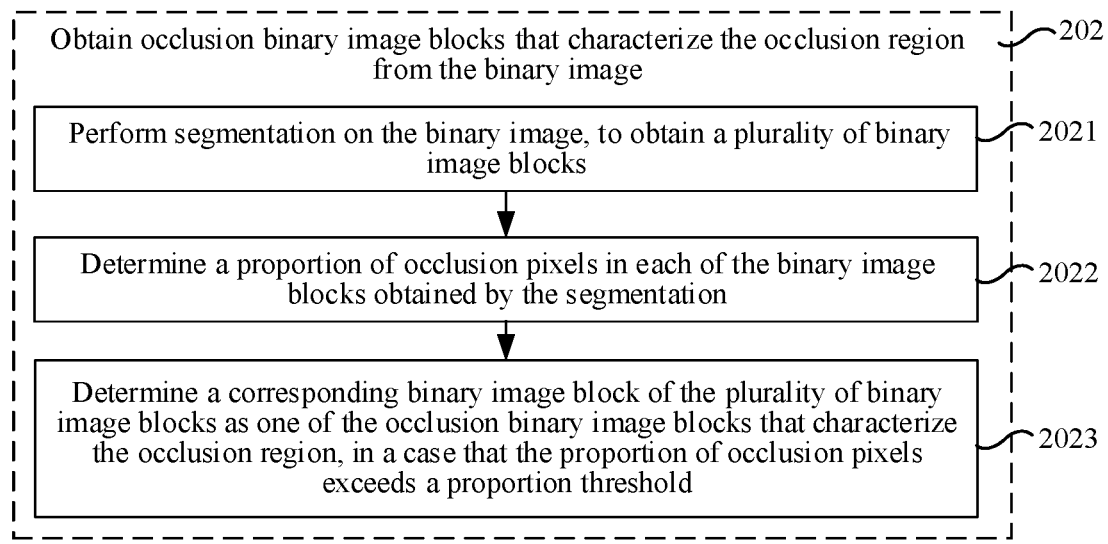

Referring to FIG. 5B, based on FIG. 5A, the operation of obtaining occlusion binary image blocks that characterize the occlusion region from the binary image in step 202 may be implemented through the following steps 2021 to 2023.

Step 2021. Segment the binary image into a plurality of binary image blocks.

Step 2022. Determine a proportion of occlusion pixels in each segmented binary image block.

Step 2023. Determine a corresponding binary image block as one of the occlusion binary image blocks that characterize the occlusion region, when or in response to determining that the proportion of occlusion pixels in the binary image block exceeds a proportion threshold.

In some embodiments, the binary image is uniformly segmented into a plurality of binary image blocks. For example, the binary image is segmented into 25 binary image blocks, with each row having 5 image blocks, and each column also having 5 image blocks. Each image block has the same size. In addition, each binary image block has its own position number. For example, an image block at the second position in the first row may be numbered 12, and an image block at the fourth position in the third row may be numbered 34.

In some embodiments, occlusion judgment is performed on each binary image, to determine all occlusion binary image blocks that characterize the occlusion region. For a binary image block having partial pixels occluded, if a proportion of occlusion pixels is relatively small, the binary image block is not determined as an occlusion binary image block; and if the proportion of occlusion pixels in the binary image block exceeds the proportion threshold, the binary image block is determined as an occlusion binary image block. That is, the proportion of the occlusion pixels in each segmented binary image block is first determined. A corresponding binary image block is determined as an occlusion binary image block characterizing the occlusion region when or in response to determining that the proportion of occlusion pixels exceeds the proportion threshold.

Step 203. Query a mapping relationship between occlusion binary image blocks and binary masks included in the binary mask dictionary based on the obtained occlusion binary image blocks, to obtain binary masks corresponding to the occlusion binary image blocks.

Figure 5C:
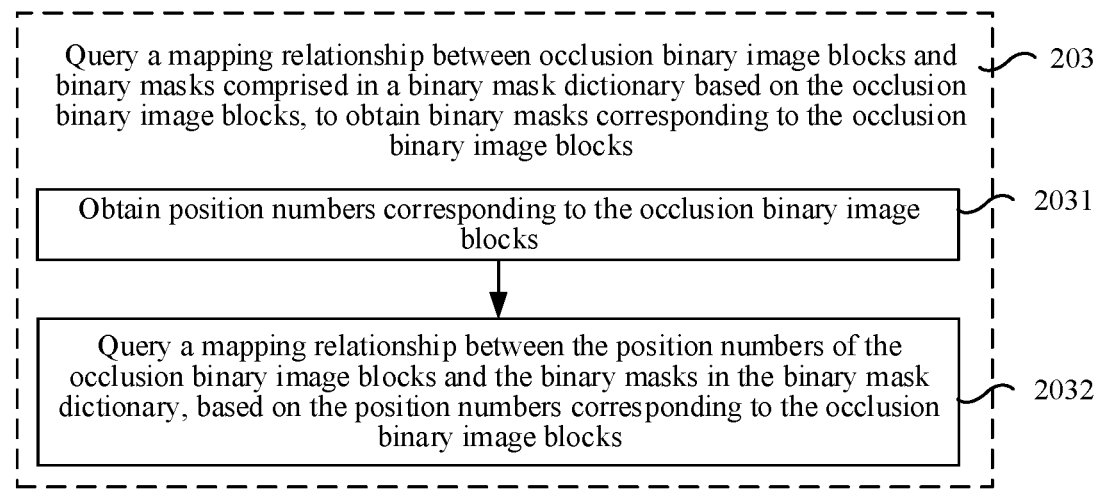

Referring to FIG. 5C, based on FIG. 5A, the operation of querying a mapping relationship between occlusion binary image blocks and binary masks included in the binary mask dictionary in step 203 may be implemented through the following steps 2031 to 2032.

Step 2031. Obtain position numbers of the corresponding occlusion binary image blocks.

Step 2032. Query a mapping relationship between the position numbers of the occlusion binary image blocks and the binary masks in the binary mask dictionary, based on the position numbers of the corresponding occlusion binary image blocks.

In some embodiments, the position number herein is the position number. The binary mask dictionary records the mapping relationship between each of occlusion binary image blocks and binary masks M. Since the occlusion binary image blocks and their respective position numbers have a one-to-one correspondence, by querying the mapping relationship between the position number of each occlusion binary image block and the binary mask, the binary mask corresponding to the occlusion binary image block can be obtained. The binary mask can characterize convolution feature elements that are influenced by a corresponding occlusion binary image block. Convolution feature elements that are more influenced may be suppressed by a value of 0 in the binary mask, and convolution feature elements that are less influenced may be retained by a value of 1 in the binary mask.

Step 204, Synthesize the binary masks queried based on each occlusion binary image block, to obtain a binary mask corresponding to the binary image.

In some embodiments, the binary masks queried for each occlusion binary image block are synthesized. The synthesis herein may be an OR logical operation. For example, the binary masks queried for the occlusion binary image blocks numbered 12, 13, and 14 are M12, M13, and M14, respectively. The OR operation is performed on the queried binary masks:

$$M = M_{12} \oplus M_{13} \oplus M_{14} \quad (2);$$

where, $\oplus$ represents the OR logical operation.

Step 205. Determine a matching relationship between the to-be-recognized image and a prestored target image, based on the binary mask of the corresponding binary image, a feature of the prestored target image, and a feature of the to-be-recognized image.

Figure 5D:
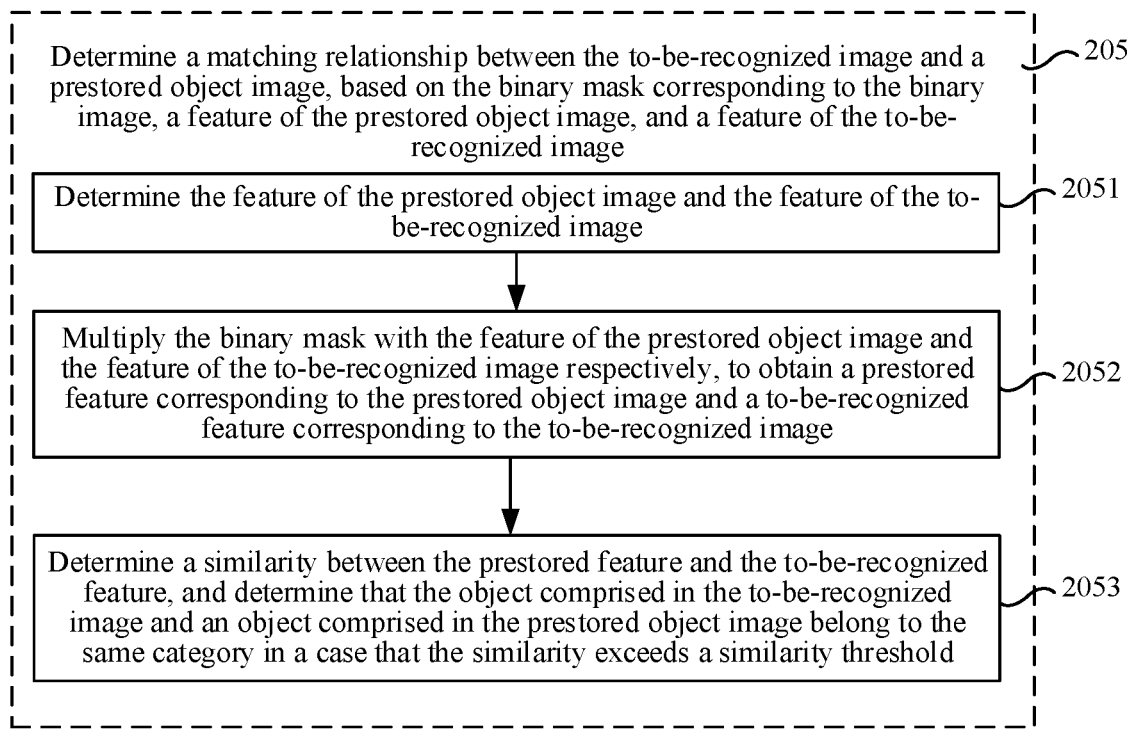

Referring to FIG. 5D, based on FIG. 5A, the operation of determining a matching relationship between the to-be-recognized image and a prestored target image, based on the binary mask of the corresponding binary image, a feature of the prestored target image, and a feature of the to-be-recognized image in step 205 may be implemented through the following steps 2051 to 2053.

Step 2051. Determine the feature of the prestored object image and the feature of the to-be-recognized image.

Step 2052. Multiply the binary mask with the feature of the prestored object image and with the feature of the to-be-recognized image respectively, to obtain a prestored feature corresponding to the prestored object image and a to-be-recognized feature corresponding to the to-be-recognized image.

In certain embodiments, the term "to-be-recognized feature" may be referred to as a feature or the feature.

Step 2053. Determine a similarity between the prestored feature and the to-be-recognized feature, and determine that the object included in the to-be-recognized image and an object included in the prestored object image belong to the same category when or in response to determining that the similarity exceeds a similarity threshold.

In some embodiments, the feature of the prestored object image and the feature of the to-be-recognized image are determined. The binary mask is multiplied with the feature of the prestored object image and with the feature of the to-be-recognized image respectively, to obtain the prestored feature corresponding to the prestored object image and the to-be-recognized feature corresponding to the to-be-recognized image. The similarity between the prestored feature and the to-be-recognized feature is determined. When or in response to determining that the similarity exceeds the similarity threshold, the object included in the to-be-recognized image and the object included in the prestored object image are determined to belong to the same category.

In some embodiments, the basic object recognition models respectively perform the feature extraction on the prestored object image and the to-be-recognized image, to determine the prestored feature of the prestored object image and the to-be-recognized feature of the to-be-recognized image. The binary mask processing module in the object recognition model multiplies the binary mask with the prestored feature of the prestored object image and the to-be-recognized feature of the to-be-recognized image respectively, to obtain the prestored feature of the prestored object image and the to-be-recognized feature corresponding to the to-be-recognized image respectively.

In some embodiments, a cosine similarity between the prestored feature and the to-be-recognized feature is calculated. During the feature extraction stage, the feature extracted from the prestored clean and non-occlusion object image is also multiplied with the binary mask. Therefore, the similarity is ensured to be calculated based on the non-occlusion part of the object in the to-be-recognized image and the corresponding part in the non-occlusion object image. For example, in a situation of a human face that a part of two eyes is occluded, the similarity is calculated based on other parts except the human eyes. Even for the prestored clean face image, the final feature extracted is still parts other than the human eyes. This can ensure that the to-be-recognized image and the prestored object image retain similar information. When or in response to determining that the similarity exceeds the similarity threshold, the object included in the to-be-recognized image and the object included in the prestored object image are determined to belong to the same category.

In some embodiments, before performing step 201, the following technical solution may be performed: detecting a key point of the to-be-recognized object in the to-be-recognized image, and determining a coordinate position of the key point; performing affine transformation on the to-be-recognized object according to the coordinate position of the key point, to align the key point to a standard template position consistent with the prestored object image. During a process of the affine transformation, the key point of the to-be-recognized object is aligned to the standard template position through the affine transformed, thereby reducing a recognition error caused by different positions or postures of the object to-be-recognized.

The following describes an exemplary implementation of this embodiment of the present disclosure in an actual implementation scenario.

The object recognition method in the present disclosure is applicable to various face recognition scenarios, such as an attendance system, a monitoring and tracing system, a security inspection system, unlocking mobile phones or computers, and so on. When a system is initialized, a user may only need to register a frontal non-occluded face image in the system, and the frontal non-occluded face image is stored in a system database as a prestored face image. When performing recognition, a user's to-be-recognized image may only need to be obtained.

Figure 6:
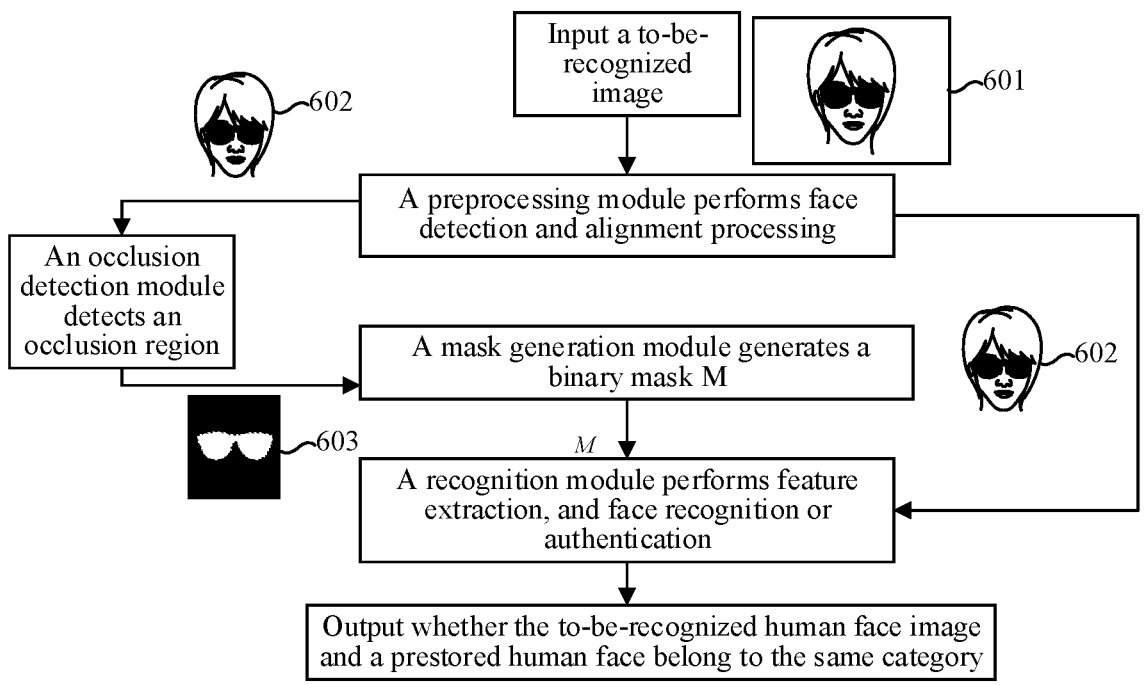
FIG. 6 is a schematic flowchart of an object recognition system performing object recognition according to one or more embodiments of the present disclosure.

Referring to FIG. 6, it is a schematic flowchart of an object recognition system based on artificial intelligence performing object recognition provided by an embodiment of the present disclosure.

A preprocessing module is configured to perform face detection and alignment processing. An inputted to-be-recognized human face image 601 is preprocessed by the preprocessing module. In the preprocessing process, first, a human face in the inputted to-be-recognized human face image is detected, and coordinate positions of a left eye, a right eye, a nose, a left lip corner, and a right lip corner are located. Then, according to the coordinate positions of five key points, the human face in the inputted to-be-recognized face image is aligned to a uniform template position through affine transformation, and is cut into a fixed size, so as to obtain an aligned to-be-recognized human face image 602.

In certain embodiments, the term "to-be-recognized face image" may be referred to as a face image or the face image, and the term "to-be-recognized human face image" may be referred to as a human face image or the human face image.

An occlusion detection module is configured to detect an occlusion region. The occlusion detection module performs occlusion detection on the to-be-recognized human face image, to detect a region where the to-be-recognized human face image is partially occluded, and output a binary image 603 having the same size as the to-be-recognized human face image, 0 representing a non-occlusion pixel, and 1 representing an occlusion pixel.

The human face key point detection used herein is based on a multi-task CNN. The occlusion detection used herein is based on a fully convolutional network structure. The training samples include artificially synthesized occlusion data and self-labeled real occlusion data.

A mask generation module is configured to generate a binary mask M. The mask generation module herein is a top-layer convolution feature mask generation module. The mask generation module receives a detection result of the occlusion detection on the to-be-recognized human face image, and synthesizes a binary mask M of the to-be-recognized human face image from the binary mask dictionary.

A recognition module is configured to perform feature extraction and perform face recognition or authentication. A feature extraction module in the recognition module is configured to perform the feature extraction respectively on the aligned to-be-recognized human face image and the prestored human face image in a system database by using the basic CNN and the binary mask of the to-be-recognized image. A classification module in the recognition module is configured to perform recognition on the to-be-recognized human face image according to the obtained feature of the to-be-recognized human face image and the feature of the prestored face image. In an implementation scenario of human face authentication, an output result indicates whether the to-be-recognized human face image and the prestored human face image in the system database are the same person. In an implementation scenario of human face recognition, an output result indicates a human face category in the system database to which the to-be-recognized human face image belongs, namely outputting whether the to-be-recognized human face and the prestored human face belong to the same category.

The following detailed description is a process of constructing the binary mask dictionary. The indexes of the dictionary are occlusion blocks of a human face image, and the index entries are binary masks. The dictionary is generated based on a basic human face recognition model, for example, a trunk CNN, which is also a model used by the recognition module.

The construction of the binary mask dictionary includes two steps: training a mask generation model, and establishing a binarized mask dictionary, namely the binary mask dictionary, based on the trained mask generation model.

In the process of training the mask generation model, first, a human face region is segmented according to a human face alignment template into B*B non-overlapping regions, which are represented as $\{b_j\}_{j=1}^{B*B}$. Referring to FIG. 7, it is a schematic diagram of a segmentation of a human face image according to an object recognition method based on artificial intelligence provided by an embodiment of the present disclosure. For example, the human face image is segmented into 5*5 blocks. A mask generator (MG) is trained for each human face image block. The MG herein is the mask generation model. Each MG aims to find out elements that are greatly influenced by an occlusion and intended to weaken their response values in a top-layer convolution feature of the human face image, when or in response to determining that a certain block $b_j$ of the human face is occluded. In an embodiment of the present disclosure, the PDSN structure is provided to learn each MG.

Referring to FIG. 8, it is a schematic structural diagram of a PDSN according to an object recognition method based on artificial intelligence provided by an embodiment of the present disclosure. The PDSN includes two identical trunk CNNs. When a j-th MG is trained, an overall input of the PDSN network is human face image pairs $(x_j^i, x^i)_{i=1}^N$, $x^i$ representing a clean non-occlusion human face, $x_j^i$ representing an occlusion human face, and N representing a total quantity of the human face image pairs. $x_j^i$ and $x^i$ belong to the same category of human face, with an only difference is that a block $b_j$ of the human face $x_j^i$ is occluded. The shared trunk CNNs respectively extract top-layer features $f(x_j^i)$, $f(x^i)$ of the human face image pairs. An absolute value $|f(x_j^i)-f(x^i)|$ of a difference between the two top-layer convolution features is used as an input of the MG. The difference input plays the role of the attention mechanism, to make the MG to focus on those feature elements that have been changed by the occlusion.

The MG is a core module of the PDSN. The MG is constituted by common neural network units, including a BN layer, a convolutional layer, and so on. Finally, an output value of the MG is mapped to a range of [0, 1] by a logistic regression activation function. A mask $m_j^i \in R^{C*H*W}$ outputted by the MG has the same size as the top-layer convolution features, and is a three-dimensional tensor with the same size as the top-layer convolution features. Each element in the mask is multiplied with a corresponding element in the original top-layer convolution feature, to obtain a new convolution feature $\tilde{f}(x_j^i)$. The convolution feature $f(\cdot)$ herein refers to an output of a convolutional layer of a CNN, which is generally a three-dimensional tensor with C channels, a height of H, and a width of W, namely $f(\cdot) \in R^{C*H*W}$. The convolution feature element herein refers to a tensor element with coordinates (c, h, w). The feature elements at the same spatial position of the convolution feature herein refers to elements of C channels with the same h-dimensional and w-dimensional coordinates.

The loss function in the training process is constituted by two kinds of loss functions, including a classification loss function $l_{cls}$ and a difference loss function $l_{diff}$. The purpose of the classification loss function is that the new feature $\tilde{f}(x_j^i)$ obtained by multiplying the top-layer convolution feature of the occlusion human face with the mask can enhance a recognition accuracy of a trunk CNN classifier, so that the MG assigns lower mask values to feature elements that hinder the recognition. The difference loss function aims to make the new feature of the occlusion human face and the convolution feature $\tilde{f}(x^i)$ of the corresponding clean human face to be as close as possible, so that the MG assigns lower mask values to feature elements having a relatively large difference between the two. The two loss functions work together to make the MG to assign lower mask values to the elements that have the relatively large difference between the convolution feature of the occlusion human face and the convolution feature of the clean human face and accordingly have influences on the recognition. These elements are the undermined elements by the occlusion that this solution focuses on. Therefore, the loss function is constructed as:

$$L_0 = \sum_i l_{cls}(\theta; \tilde{f}(x_j^i), y^i) + \gamma 1_{diff}(\theta; \tilde{f}(x_j^i), \tilde{f}(x^i)) = \qquad (3)$$
$$-\sum_i \log(p_{y_i}(F(M_\theta(\cdot)f(x_j^i)))) + \gamma M_\theta(\cdot)f(x_j^i) - M_\theta(\cdot)f(x^i)_1;$$

where, $M_\theta(\cdot) = M_\theta(|f(x_j^i) - f(x^i)|)$ represents the output of the MG, F represents a fully connected layer or an average pooling layer subsequent to a top-layer convolutional layer of the Trunk CNN, and $p_{y_i}(\cdot)$ represents a probability that the Trunk CNN classifies correctly.

In an embodiment of the present disclosure, a human face region is segmented into B*B non-overlapping regions, so a total of B*B MGs may need to be trained. The trunk CNN parts of these MGs are all the same and have fixed parameters, and their training data comes from the same database.

In the process of establishing the binarized mask dictionary based on the trained mask generation model, after the training stage of each MG is performed, elements in a top-layer convolution feature of a human face image that are undermined and intended to weaken their response values when or in response to determining that each block of the human face image is occluded are obtained according to the output of each MG. The weakened elements correspond to lower output values of each MG. An index of the binary mask dictionary is the human face block bj, and an index entry is the binary mask Mj. The mask Mj has the same size as the top-layer convolution feature of the Trunk CNN. A value of 0 in the Mj represents a feature element that is intended to be removed from the recognition when or in response to determining that the human face block bj is occluded.

Referring to FIG. 9, it is a schematic flowchart of computing each index entry Mj in a binary mask dictionary according to an object recognition method based on artificial intelligence provided by an embodiment of the present disclosure.

Step 901. Input a plurality of human face image sample pairs into the trained PDSN, to obtain mask sets outputted by a series of MGs. A mask set may be $\{m_j^1, m_j^2, \ldots, m_j^N\}$, representing a quantity of sample pairs, and j representing a mask outputted by the MG for the position number j. The human face image sample pairs herein may be the same as the training samples used in the MG training process.

Step 902. Normalize each mask in the mask set generated in step 901. For example, a corresponding normalization formula for $m_j^n$ is:

$$m_j^n = \frac{m_j^n - \min(m_j^n)}{\max(m_j^n) - \min(m_j^n)}; \qquad (4)$$

where, max( ) is a maximum value of sample data, and min( ) is a minimum value of sample data.

Step 903. Calculate an average value of the normalized masks, to obtain an average mask corresponding to the j-th MG:

$$\overline{m}_j = \frac{1}{N}\sum_{n=1}^{N} m_j^n.$$

Step 904. Binarize the average mask, to obtain a binarized dictionary index entry. The binarized dictionary index entry is the binary mask Mj.

In an average mask, a smaller mask value indicates that a corresponding convolution feature element is more suppressed. According to an embodiment of the present disclosure, convolution feature elements corresponding to τ*K smallest mask values in an average mask are regarded as parts that are undermined by an occlusion (τ is a real number in a range of [0,1], which may be 0.25; and K is a total quantity of elements in the average mask, and also a total quantity of elements in the top-layer convolution feature K=C*H*W). A way of obtaining the index entry Mj of the binary mask dictionary according to the average mask $\overline{m}_j$ is as follows:

$$M_j[k]=0, if \overline{m}_j[k] \in \{\tilde{m}_j[1], \tilde{m}_j[2], \ldots, \tilde{m}_j[\tau*K]\}$$

$$M_j[k]=1, else \qquad (5);$$

where, k represents a k-th mask value, and $\{\tilde{m}_j[1], \tilde{m}_j[2], \ldots, \tilde{m}_j[\tau*K]\}$ represents τ*K smallest mask values in the average mask.

According to the process illustrated in FIG. 9, a corresponding binary mask is generated for each MG, to construct the binary mask dictionary that occlusion human face image blocks correspond to binary masks: $D=\{(b_j:M_j)\}_{j=1}^{B*B}$. The dictionary herein is an occlusion block-mask dictionary.

Figure 10:
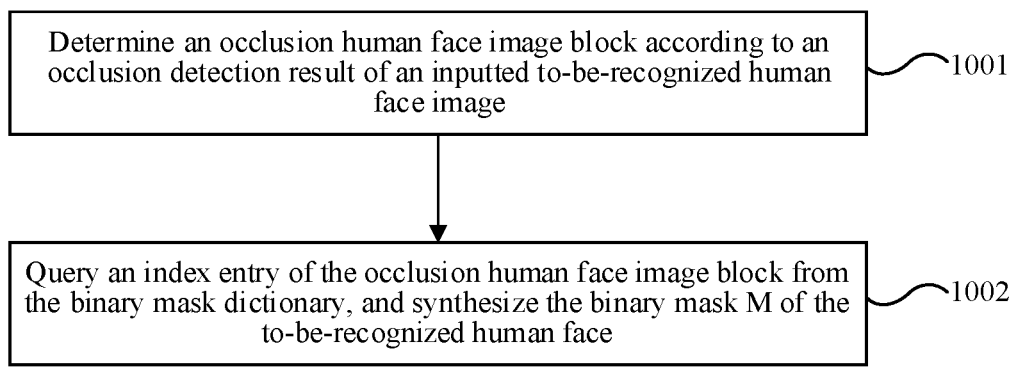
FIG. 10 is a schematic flowchart of synthesizing a binary mask M of a to-be-recognized human face image according to an object recognition method according to one or more embodiments of the present disclosure.

The following describes a process of synthesizing the binary mask M of the to-be-recognized human face image based on the binary mask dictionary. Referring to FIG. 10, it is a schematic flowchart of synthesizing a binary mask M of a to-be-recognized human face image according to an object recognition method based on artificial intelligence provided by an embodiment of the present disclosure.

Step 1001. Determine an occlusion human face image block according to an occlusion detection result of an inputted to-be-recognized human face image. The occlusion detection result is a binary image with the same size as the to-be-recognized human face image. 0 represents a non-occluded pixel, and 1 represents an occlusion pixel. When or in response to determining that a quantity of pixels each with a value of 1 within a certain human face image block is greater than half of a total quantity of pixels within the certain human face image block, the certain human face image block is determined as an occlusion human face image block where an occlusion is present.

Step 1002. Query an index entry of the occlusion human face image block from the binary mask dictionary, and synthesize the binary mask M of the to-be-recognized human face. The index entry herein is Mj. The human face image shown in FIG. 6 is used as an example. When or in response to determining that the human face image is segmented into 5*5 blocks, human face blocks where an occlusion is present have been determined in step 1001 to be $b_{12}$, $b_{13}$, $b_{14}$. According to the binary mask dictionary established in the training stage, the binary mask corresponding to the to-be-recognized human face image is: $M=M_{12}\oplus M_{13}\oplus M_{14}$, $\oplus$ representing the OR logical operation.

Figure 11:
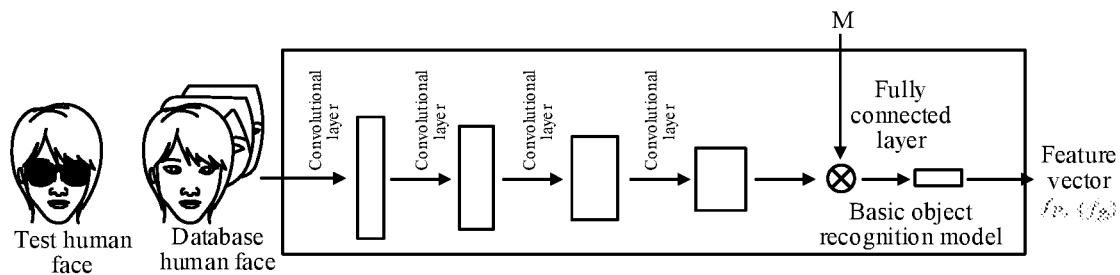
FIG. 11 is a schematic diagram of feature extraction according to an object recognition method according to one or more embodiments of the present disclosure.

Referring to FIG. 11, it is a schematic diagram of feature extraction according to an object recognition method based on artificial intelligence provided by an embodiment of the present disclosure.

The Trunk CNN used in the feature extraction stage has exactly the same parameters as that used in the dictionary construction stage. In terms of the structure, a branch of inputting the binary mask M is additionally provided. That is, the branch of inputting the binary mask M is additionally provided on the basic object recognition model. In order to adapt the fully connected layer subsequent to the top-layer convolutional layer of the Trunk CNN for the binarized mask, the parameters of the fully connected layer are fine-tuned according to arbitrarily occluded human face samples and their binary masks. All the previous parameters of the fully connected layer remain unchanged. The fine-tuning stage uses a small learning rate $1e^{-4}$, which can perform six rounds of training. The classification loss function used in the loss function is the same as that used when training the Trunk CNN.

In practical implementations, the top-layer convolution features of human face images may be directly stored in the database. In a situation of recognizing a to-be-recognized human face image, the mask is respectively multiplied with the top-layer convolution feature of the to-be-recognized human face image and the top-layer convolution features in the database. Then, final feature vectors used in the classification are obtained by the fine-tuned fully connected layer or the average pooling layer of the Trunk CNN.

After extracting the feature vectors, the cosine similarity between the feature vector $f_p$ of the to-be-recognized human face image (the test human face in FIG. 11) and the feature vector $\{f_{g_i}\}$ of each human face image in the database (the database human face in FIG. 11) is calculated:

$$s(p, g_i) = \frac{f_p \cdot f_{g_i}}{\|f_p\| \|f_{g_i}\|}; \tag{6}$$

where, $s(p,g_i)$ is the cosine similarity between the feature vector $f_p$ and the feature vector $f_{g_i}$ of each human face image in the database.

In the feature extraction stage, the features of clean non-occlusion human faces in the database are also multiplied by the mask M, to ensure that the similarity is calculated based on the non-occlusion part of the to-be-recognized human face image. That is, the to-be-recognized human face image retains similar amount of information with the human face image features in the database.

In a scenario of human face recognition, it may be desirable to recognize which human face category in the database the to-be-recognized human image belongs to. A nearest neighbor classifier may be used. That is, the category of a human face image in the database with the highest similarity to the test human face is the category to which the to-be-recognized human face belongs. Alternatively, any other commonly used classifier may be adopted.

In a scenario of human face authentication, it may be desirable to recognize whether the to-be-recognized human face image and a human face image in the database belong to the same person. A manner of threshold judgment may be used. That is, when or in response to determining that a similarity between the to-be-recognized human face image and a human face image in the database is higher than a certain threshold, the two are considered to be the same person; and vice versa, the two are considered not to be the same person. Alternatively, a classifier for human face authentication may be specially trained based on the feature vector.

Figure 12:
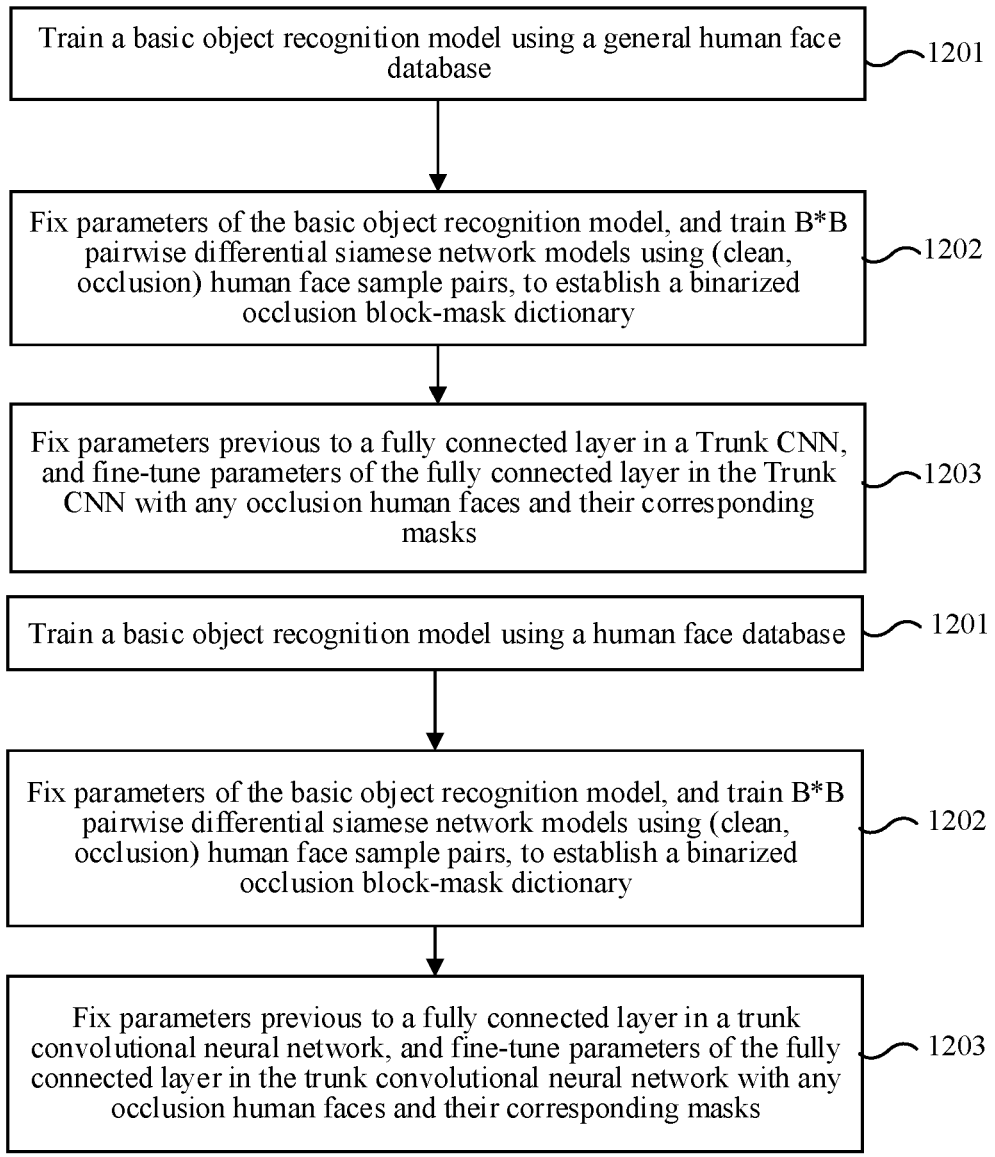
FIG. 12 is a schematic diagram of model construction according to an object recognition method according to one or more embodiments of the present disclosure.

Referring to FIG. 12, it is a schematic diagram of model construction according to an object recognition method based on artificial intelligence provided by an embodiment of the present disclosure.

In a system architecture provided by an embodiment of the present disclosure, in addition to fine-tuning the parameters of the fully connected layer in the feature extraction module and establishing the binary mask dictionary, a basic human face recognition model may also be trained. A source database of training samples is not limited, which may be a common public database of human faces or a user's own private database, as long as a preprocessing process of training data is the same as the preprocessing process. A model training process for an object recognition method provided by the embodiment of the present disclosure is as follows: in step 1201, training a basic object recognition model using a human face database; in step 1202, fixing parameters of the basic object recognition model, and training B*B PDSN models using (clean, occlusion) human face sample pairs, to establish a binarized occlusion block-mask dictionary; and in step 1203, fixing parameters previous to a fully connected layer in a Trunk CNN, and fine-tuning parameters of the fully connected layer in the Trunk CNN with any occlusion human faces and their corresponding masks.

The following continues to describe an exemplary structure of an object recognition apparatus 255 based on artificial intelligence provided by an embodiment of the present disclosure implemented as software modules. In some embodiments, as shown in FIG. 3, the software modules of the object recognition apparatus 255 based on artificial intelligence that are stored in the memory 250 may include: an occlusion detecting module 2551, configured to detect a potential occlusion region of a to-be-recognized object in a to-be-recognized image, to obtain a binary image that characterizes the occlusion region and a non-occlusion region of the to-be-recognized object; an occlusion binary image block obtaining module 2552, configured to obtain occlusion binary image blocks that characterize the occlusion region from the binary image; a binary mask querying module 2553, configured to query a mapping relationship between occlusion binary image blocks and binary masks included in a binary mask dictionary based on the occlusion binary image blocks, to obtain binary masks corresponding to the occlusion binary image blocks; a binary mask synthesizing module 2554, configured to synthesize the binary masks queried based on each of the occlusion binary image blocks, to obtain a binary mask corresponding to the binary image; and a matching relationship determining module 2555, configured to determine a matching relationship between the to-be-recognized image and a prestored object image, based on the binary mask corresponding to the binary image, a feature of the prestored object image, and a feature of the to-be-recognized image.

In some embodiments, the occlusion binary image block obtaining module 2552 is further configured to: perform segmentation on the binary image, to obtain a plurality of binary image blocks; determine a proportion of occlusion pixels in each of the binary image blocks obtained by the segmentation; and determine a corresponding binary image block of the plurality of binary image blocks as one of the occlusion binary image blocks that characterize the occlusion region, when or in response to determining that the proportion of occlusion pixels exceeds a proportion threshold.

In some embodiments, the binary mask querying module 2553 is further configured to: obtain position numbers corresponding to the occlusion binary image blocks; and query a mapping relationship between the position numbers of the occlusion binary image blocks and the binary masks in the binary mask dictionary, based on the position numbers corresponding to the occlusion binary image blocks.

In some embodiments, the matching relationship determining module 2555 is further configured to: determine the feature of the prestored object image and the feature of the to-be-recognized image; multiply the binary mask with the feature of the prestored object image and the feature of the to-be-recognized image respectively, to obtain a prestored feature corresponding to the prestored object image and a to-be-recognized feature corresponding to the to-be-recognized image; and determine a similarity between the prestored feature and the to-be-recognized feature, and determine that the object included in the to-be-recognized image and an object included in the prestored object image belong to the same category when or in response to determining that the similarity exceeds a similarity threshold.

In some embodiments, the object recognition apparatus 255 based on artificial intelligence further includes: a binary mask dictionary constructing module 2556, configured to construct a training sample set that includes object image sample pairs for different position numbers based on an object image database, the object image sample pairs including object image samples and object image samples subjected to occlusion processing; construct a pairwise differential siamese network model based on a basic object recognition model and a mask generation model; train the pairwise differential siamese network model based on the training sample set; and construct the binary mask dictionary based on the trained pairwise differential siamese network model. Indexes of the binary mask dictionary are the occlusion binary image blocks, and index entries of the binary mask dictionary are the binary masks.

In some embodiments, the binary mask dictionary constructing module 2556 is further configured to: obtain an object image sample in the object image database, and performing uniform segmentation on the object image sample, to obtain position numbers corresponding to different object image sample blocks; perform the occlusion processing on an object image sample block among the different object image sample blocks in the object image sample corresponding to a position number among the position numbers; construct the object image sample and an object image sample subjected to the occlusion processing into an object image sample pair for the position number; and form the training sample set based on the object image sample pairs for different position numbers.

In some embodiments, the binary mask dictionary constructing module 2556 is further configured to: initialize a mask generation model in the pairwise differential siamese network model, and initialize a loss function including an input sample, an input sample feature, a classification probability, and a parameter of the mask generation model. The following processing is performed during each iteration of training the pairwise differential siamese network model: using the object image sample pairs included in the training sample set as the input sample, and performing, by the pairwise differential siamese network model, feature extraction on the input sample, to obtain the input sample feature; performing, by the object recognition model, classification and recognition on the object image samples subjected to the occlusion processing, to obtain the classification probability; substituting the input sample, the input sample feature, the classification probability into the loss function, to determine the parameter of the pairwise differential siamese network model when or in response to determining that the loss function takes a minimum value; and updating the pairwise differential siamese network model according to the determined parameter of the mask generation model.

In some embodiments, the binary mask dictionary constructing module 2556 is further configured to: use object image sample pairs for the same position number in the training sample set as the input sample, and perform, by a convolutional layer in the pairwise differential siamese network model, feature extraction on the input sample, to obtain a first feature and a second feature respectively corresponding to the object image samples and the object image samples subjected to the occlusion processing; perform, by the mask generation model in the pairwise differential siamese network model, mask generation processing on an absolute value of a difference between the first feature and the second feature, to obtain a mask for the position number; and multiply the first feature and the second feature with the mask respectively, to obtain the input sample feature.

In some embodiments, the binary mask dictionary constructing module 2556 is further configured to: perform, by the pairwise differential siamese network model, mask extraction on object image sample pairs for the same position number, to obtain a mask set corresponding to the position number; normalize each mask in the mask set, and calculating an average value based on a normalization result of each mask, to determine an average mask corresponding to the position number; and use the occlusion binary image block corresponding to the position number as the one of the indexes of the binary mask dictionary, and binarize the average mask, to use a generated binary mask as one of the index entries of the binary mask dictionary.

In some embodiments, the object recognition apparatus 255 based on artificial intelligence further includes: an object recognition model training module 2557, configured to train a basic object recognition model that is configured to obtain the feature of the prestored object image and the feature of the to-be-recognized image, based on the training sample set formed by the object image database; and train an object recognition model that is configured to determine the matching relationship between the to-be-recognized image and the prestored object image based on the training sample set, the object recognition model including the basic object recognition model and a binary mask processing module.

In some embodiments, the object recognition model training module 2557 is further configured to: initialize a fully connected layer in the object recognition model, and initialize a loss function including an input sample, a classification and recognition result, and a parameter of the fully connected layer in the object recognition model. The following processing is performed during each iteration of training the object recognition model: using object image samples subjected to occlusion processing included in the training sample set and corresponding binary masks in the binary mask dictionary as the input sample, and performing, by the object recognition model, classification and recognition on the input sample, to obtain a classification and recognition result corresponding to the input sample; substituting the input sample and the classification and recognition result into the loss function, to determine the parameter of the fully connected layer in the object recognition model when or in response to determining that the loss function takes a minimum value; and updating the object recognition model according to the determined parameter of the fully connected layer.

In some embodiments, the object recognition apparatus 255 based on artificial intelligence further includes: an affine transformation module 2558, configured to detect a key point of the to-be-recognized object in the to-be-recognized image, and determining a coordinate position of the key point; and perform affine transformation on the to-be-recognized object according to the coordinate position of the key point, to align the key point to a standard template position consistent with the prestored object image.

An embodiment of the present disclosure provides a computer-readable storage medium, storing executable instructions. The executable instructions, when executed by a processor, causes the processor to perform the object recognition method based on artificial intelligence provided by the embodiments of the present disclosure, for example, the object recognition methods based on artificial intelligence shown in FIG. 4 and FIG. 5A to FIG. 5D.

In some embodiments, the computer-readable storage medium may be a memory such as a ferroelectric RAM (FRAM), a ROM, a programmable ROM (PROM), an electrical programmable ROM (EPROM), an electrically erasable programmable ROM (EEPROM), a flash memory, a magnetic surface memory, an optical disk, or a compact disc ROM (CD-ROM); and may alternatively be a storage device including one or any combination of the memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In an example, the executable instructions can be deployed for execution on one computing device, execution on a plurality of computing devices located at one location, or execution on a plurality of computing devices that are distributed at a plurality of locations and that are interconnected through a communication network.

From the above, according to the embodiments of the present disclosure, when or in response to determining that a to-be-recognized object is not occluded, the performance of recognizing the non-occlusion object can be maintained. At the same time, when or in response to determining that a to-be-recognized object is occluded, influences caused by an occlusion region on feature elements of the to-be-recognized object are suppressed, thereby greatly improving the accuracy of recognizing the occlusion object. The solution of the present disclosure has a better test performance in a real occlusion database and a synthetic occlusion database than any solution in the related art.

The descriptions are merely embodiments of the present disclosure and are not intended to limit the protection scope of the present disclosure. Any modification, equivalent replacement, or improvement made without departing from the spirit and range of the present disclosure shall fall within the protection scope of the present disclosure.

INDUSTRIAL APPLICABILITY

The electronic device in the embodiments of the present disclosure distinguishes an occlusion region and a non-occlusion region in a to-be-recognized image, and obtains a binary mask of the occlusion region in the to-be-recognized image, so as to perform image recognition based on the binary mask, the to-be-recognized image and a prestored image. In this way, when or in response to determining that a to-be-recognized object is occluded, influences caused by the occlusion region on feature elements of the to-be-recognized object are suppressed, thereby improving an accuracy of recognizing the to-be-recognized object.

What is claimed is:

1. An object recognition method, performed by an electronic device, and the object recognition method comprising:
   detecting an occlusion region of an object in an image, to obtain a binary image that characterizes the occlusion region and a non-occlusion region of the object;
   obtaining occlusion binary image blocks that characterize the occlusion region from the binary image;
   querying a mapping relationship between the occlusion binary image blocks and binary masks included in a binary mask dictionary based on the occlusion binary image blocks, to obtain binary masks corresponding to the occlusion binary image blocks;

synthesizing the binary masks queried based on each of the occlusion binary image blocks, to obtain a binary mask corresponding to the binary image; and determining a matching relationship between the image and a prestored object image, based on the binary mask corresponding to the binary image, a feature of the prestored object image, and a feature of the image, wherein the binary mask dictionary is obtained by:
constructing a training sample set that includes object image sample pairs for different position numbers based on an object image database, the object image sample pairs including object image samples and object image samples subjected to occlusion processing;

constructing a pairwise differential siamese network model based on a basic object recognition model and a mask generation model;

training the pairwise differential siamese network model based on the training sample set; and constructing the binary mask dictionary based on the trained pairwise differential siamese network model, indexes of the binary mask dictionary being the occlusion binary image blocks, and index entries of the binary mask dictionary being the binary masks.

2. The object recognition method according to claim 1, wherein obtaining the occlusion binary image blocks comprises:
performing segmentation on the binary image, to obtain a plurality of binary image blocks;

determining a proportion of occlusion pixels in each of the binary image blocks obtained by the segmentation; and determining a corresponding binary image block of the plurality of binary image blocks as one of the occlusion binary image blocks that characterize the occlusion region, in response to determining that the proportion of occlusion pixels in the corresponding binary image block exceeds a proportion threshold.

3. The object recognition method according to claim 1, wherein querying the mapping relationship between the occlusion binary image blocks and the binary masks comprises:
obtaining position numbers corresponding to the occlusion binary image blocks; and querying a mapping relationship between the position numbers of the occlusion binary image blocks and the binary masks in the binary mask dictionary, based on the position numbers corresponding to the occlusion binary image blocks.

4. The object recognition method according to claim 1, wherein determining the matching relationship between the image and the prestored object image comprises:
determining the feature of the prestored object image and the feature of the image;

multiplying the binary mask corresponding to the binary image with the feature of the prestored object image and the feature of the image respectively, to obtain a prestored feature corresponding to the prestored object image and a feature corresponding to the image; and determining a similarity between the prestored feature and the feature, and determining that the object included in the image and an object included in the prestored object image belong to the same category in response to determining that the similarity exceeds a similarity threshold.

5. The object recognition method according to claim 1, further comprising:

training a basic object recognition model that is configured to obtain the feature of the prestored object image and the feature of the image, based on the training sample set formed by the object image database; and training an object recognition model that is configured to determine the matching relationship between the image and the prestored object image based on the training sample set, the object recognition model including the basic object recognition model and a binary mask processing module.

6. The object recognition method according to claim 5, wherein training the object recognition model comprises:
initializing a fully connected layer in the object recognition model, and initializing a loss function comprising an input sample, a classification and recognition result, and a parameter of the fully connected layer in the object recognition model;

using object image samples subjected to occlusion processing included in the training sample set and corresponding binary masks in the binary mask dictionary as the input sample, and performing, by the object recognition model, classification and recognition on the input sample, to obtain a classification and recognition result corresponding to the input sample;

substituting the input sample and the classification and recognition result into the loss function, to determine the parameter of the fully connected layer in the object recognition model, in response to determining that the loss function takes a minimum value; and updating the object recognition model according to the determined parameter of the fully connected layer.

7. The object recognition method according to claim 1, further comprising:
detecting a key point of the object in the image, and determining a coordinate position of the key point; and performing affine transformation on the object according to the coordinate position of the key point, to align the key point to a standard template position consistent with the prestored object image.

8. The object recognition method according to claim 1, wherein constructing the training sample set comprises:
obtaining an object image sample in the object image database, and performing uniform segmentation on the object image sample, to obtain position numbers corresponding to different object image sample blocks;

performing the occlusion processing on an object image sample block among the different object image sample blocks in the object image sample corresponding to a position number among the position numbers;

constructing the object image sample and an object image sample subjected to the occlusion processing into an object image sample pair for the position number; and forming the training sample set based on the object image sample pairs for different position numbers.

9. The object recognition method according to claim 1, wherein training the pairwise differential siamese network model comprises:
initializing a mask generation model in the pairwise differential siamese network model, and initializing a loss function comprising an input sample, an input sample feature, a classification probability, and a parameter of the mask generation model;

using the object image sample pairs included in the training sample set as the input sample, and performing, by the pairwise differential siamese network model, feature extraction on the input sample, to obtain the input sample feature;

performing, by the basic object recognition model, classification and recognition on the object image samples subjected to the occlusion processing, to obtain the classification probability;

substituting the input sample, the input sample feature, the classification probability into the loss function, to determine the parameter of the mask generation model in response to determining that the loss function takes a minimum value; and updating the pairwise differential siamese network model according to the determined parameter of the mask generation model.

10. The object recognition method according to claim 9, wherein using the object image sample pairs and performing the feature extraction to obtain the input sample feature comprises:

using object image sample pairs for the same position number in the training sample set as the input sample, and performing, by a convolutional layer in the pairwise differential siamese network model, feature extraction on the input sample, to obtain a first feature and a second feature respectively corresponding to the object image samples and the object image samples subjected to the occlusion processing;

performing, by the mask generation model in the pairwise differential siamese network model, mask generation processing on an absolute value of a difference between the first feature and the second feature, to obtain a mask for the position number; and multiplying the first feature and the second feature with the mask respectively, to obtain the input sample feature.

11. The object recognition method according to claim 1, wherein constructing the binary mask dictionary comprises:

performing, by the pairwise differential siamese network model, mask extraction on object image sample pairs for the same position number, to obtain a mask set corresponding to the position number;

normalizing each mask in the mask set, and calculating an average value based on a normalization result of each mask, to determine an average mask corresponding to the position number; and using the occlusion binary image block corresponding to the position number as the one of the indexes of the binary mask dictionary, and binarizing the average mask, to use a generated binary mask as one of the index entries of the binary mask dictionary.

12. An object recognition apparatus, comprising: a memory storing computer program instructions; and a processor coupled to the memory and configured to execute the computer program instructions and perform:

detecting an occlusion region of an object in an image, to obtain a binary image that characterizes the occlusion region and a non-occlusion region of the object;

obtaining occlusion binary image blocks that characterize the occlusion region from the binary image;

querying a mapping relationship between the occlusion binary image blocks and binary masks included in a binary mask dictionary based on the occlusion binary image blocks, to obtain binary masks corresponding to the occlusion binary image blocks;

synthesizing the binary masks queried based on each of the occlusion binary image blocks, to obtain a binary mask corresponding to the binary image; and determining a matching relationship between the image and a prestored object image, based on the binary mask corresponding to the binary image, a feature of the prestored object image, and a feature of the image, wherein the binary mask dictionary is obtained by:

constructing a training sample set that includes object image sample pairs for different position numbers based on an object image database, the object image sample pairs including object image samples and object image samples subjected to occlusion processing;

constructing a pairwise differential siamese network model based on a basic object recognition model and a mask generation model;

training the pairwise differential siamese network model based on the training sample set; and constructing the binary mask dictionary based on the trained pairwise differential siamese network model, indexes of the binary mask dictionary being the occlusion binary image blocks, and index entries of the binary mask dictionary being the binary masks.

13. The object recognition apparatus according to claim 12, wherein obtaining the occlusion binary image blocks includes:

performing segmentation on the binary image, to obtain a plurality of binary image blocks;

determining a proportion of occlusion pixels in each of the binary image blocks obtained by the segmentation; and determining a corresponding binary image block of the plurality of binary image blocks as one of the occlusion binary image blocks that characterize the occlusion region, in response to determining that the proportion of occlusion pixels in the corresponding binary image block exceeds a proportion threshold.

14. The object recognition apparatus according to claim 12, wherein querying the mapping relationship between the occlusion binary image blocks and the binary masks includes:

obtaining position numbers corresponding to the occlusion binary image blocks; and querying a mapping relationship between the position numbers of the occlusion binary image blocks and the binary masks in the binary mask dictionary, based on the position numbers corresponding to the occlusion binary image blocks.

15. The object recognition apparatus according to claim 12, wherein determining the matching relationship between the image and the prestored object image includes:

determining the feature of the prestored object image and the feature of the image;

multiplying the binary mask corresponding to the binary image with the feature of the prestored object image and the feature of the image respectively, to obtain a prestored feature corresponding to the prestored object image and a feature corresponding to the image; and determining a similarity between the prestored feature and the feature, and determining that the object included in the image and an object included in the prestored object image belong to the same category in response to determining that the similarity exceeds a similarity threshold.

16. The object recognition apparatus according to claim 12, wherein constructing the training sample set includes:

obtaining an object image sample in the object image database, and performing uniform segmentation on the object image sample, to obtain position numbers corresponding to different object image sample blocks;

performing the occlusion processing on an object image sample block among the different object image sample blocks in the object image sample corresponding to a position number among the position numbers;

constructing the object image sample and an object image sample subjected to the occlusion processing into an object image sample pair for the position number; and forming the training sample set based on the object image sample pairs for different position numbers.

17. The object recognition apparatus according to claim 12, wherein training the pairwise differential siamese network model includes:

initializing a mask generation model in the pairwise differential siamese network model, and initializing a loss function comprising an input sample, an input sample feature, a classification probability, and a parameter of the mask generation model;

using the object image sample pairs included in the training sample set as the input sample, and performing, by the pairwise differential siamese network model, feature extraction on the input sample, to obtain the input sample feature;

performing, by the basic object recognition model, classification and recognition on the object image samples subjected to the occlusion processing, to obtain the classification probability;

substituting the input sample, the input sample feature, the classification probability into the loss function, to determine the parameter of the mask generation model in response to determining that the loss function takes a minimum value; and updating the pairwise differential siamese network model according to the determined parameter of the mask generation model.

18. A non-transitory computer-readable storage medium storing computer program instructions executable by at least one processor to perform:

detecting an occlusion region of an object in an image, to obtain a binary image that characterizes the occlusion region and a non-occlusion region of the object;

obtaining occlusion binary image blocks that characterize the occlusion region from the binary image;

querying a mapping relationship between the occlusion binary image blocks and binary masks included in a binary mask dictionary based on the occlusion binary image blocks, to obtain binary masks corresponding to the occlusion binary image blocks;

synthesizing the binary masks queried based on each of the occlusion binary image blocks, to obtain a binary mask corresponding to the binary image; and determining a matching relationship between the image and a prestored object image, based on the binary mask corresponding to the binary image, a feature of the prestored object image, and a feature of the image, wherein the binary mask dictionary is obtained by:

constructing a training sample set that includes object image sample pairs for different position numbers based on an object image database, the object image sample pairs including object image samples and object image samples subjected to occlusion processing;

constructing a pairwise differential siamese network model based on a basic object recognition model and a mask generation model;

training the pairwise differential siamese network model based on the training sample set; and constructing the binary mask dictionary based on the trained pairwise differential siamese network model, indexes of the binary mask dictionary being the occlusion binary image blocks, and index entries of the binary mask dictionary being the binary masks.

* * * * *